United States Patent
Lindhé et al.

(10) Patent No.: US 10,969,778 B2
(45) Date of Patent: Apr. 6, 2021

(54) ROBOTIC CLEANING DEVICE AND A METHOD OF CONTROLLING THE ROBOTIC CLEANING DEVICE

(71) Applicant: Aktiebolaget Electrolux, Stockholm (SE)

(72) Inventors: Magnus Lindhé, Stockholm (SE); Petter Forsberg, Stockholm (SE)

(73) Assignee: AKTIEBOLAGET ELECTROLUX, Stockholm (SE)

(*) Notice: Subject to any disclaimer, the term of this patent is extended or adjusted under 35 U.S.C. 154(b) by 486 days.

(21) Appl. No.: 15/565,467

(22) PCT Filed: Apr. 17, 2015

(86) PCT No.: PCT/EP2015/058377
§ 371 (c)(1),
(2) Date: Oct. 10, 2017

(87) PCT Pub. No.: WO2016/165772
PCT Pub. Date: Oct. 20, 2016

(65) Prior Publication Data
US 2018/0120833 A1    May 3, 2018

(51) Int. Cl.
*G05D 1/00* (2006.01)
*G05D 1/02* (2020.01)
*A47L 9/28* (2006.01)

(52) U.S. Cl.
CPC .......... *G05D 1/0022* (2013.01); *A47L 9/2805* (2013.01); *A47L 9/2842* (2013.01); *A47L 9/2847* (2013.01); *A47L 9/2852* (2013.01); *G05D 1/0212* (2013.01); *A47L 2201/04* (2013.01); *A47L 2201/06* (2013.01)

(58) Field of Classification Search
CPC ............... G05D 1/00; G05D 1/02; A47L 9/28
See application file for complete search history.

(56) References Cited

U.S. PATENT DOCUMENTS

| | | | |
|---|---|---|---|
| 1,286,321 A | 12/1918 | Hoover |
| 1,401,007 A | 12/1921 | Staples |
| 3,010,129 A | 11/1961 | Moore |
| 3,233,274 A | 2/1966 | Kroll |

(Continued)

FOREIGN PATENT DOCUMENTS

| | | |
|---|---|---|
| CA | 2154758 | 6/1995 |
| CN | 1116818 | 2/1996 |

(Continued)

OTHER PUBLICATIONS

Notice of Allowance for U.S. Appl. No. 14/784,106, dated Oct. 11, 2018, 7 pages.

(Continued)

*Primary Examiner* — Kira Nguyen
(74) *Attorney, Agent, or Firm* — RatnerPrestia

(57) ABSTRACT

A robotic cleaning device having an inertia measurement unit and a controller. The inertia measurement unit is arranged to sense a displacement of the robotic cleaning device and the controller is arranged to determine a characteristic of the displacement of the robotic cleaning device, and to set the robotic cleaning device in an operational mode being associated with the determined characteristic of the displacement.

20 Claims, 7 Drawing Sheets

(56) References Cited

U.S. PATENT DOCUMENTS

| | | |
|---|---|---|
| 3,550,714 A | 12/1970 | Bellinger |
| 3,570,227 A | 3/1971 | Bellinger |
| 3,713,505 A | 1/1973 | Muller |
| 3,837,028 A | 9/1974 | Bridge |
| 4,028,765 A | 6/1977 | Liebscher |
| 4,036,147 A | 7/1977 | Westling |
| 4,114,711 A | 9/1978 | Wilkins |
| 4,119,900 A | 10/1978 | Kremnitz |
| 4,306,174 A | 12/1981 | Mourier |
| 4,306,329 A | 12/1981 | Yokoi |
| 4,369,543 A | 1/1983 | Chen |
| 4,502,173 A | 3/1985 | Patzold |
| 4,627,511 A | 12/1986 | Yajima |
| 4,647,209 A | 3/1987 | Neukomm |
| 4,800,978 A | 1/1989 | Wasa |
| 4,822,450 A | 4/1989 | Davis |
| 4,825,091 A | 4/1989 | Breyer |
| 4,836,905 A | 6/1989 | Davis |
| 4,838,990 A | 6/1989 | Jucha |
| 4,842,686 A | 6/1989 | Davis |
| 4,849,067 A | 7/1989 | Jucha |
| 4,854,000 A | 8/1989 | Takimoto |
| 4,864,511 A | 9/1989 | Moy |
| 4,872,938 A | 10/1989 | Davis |
| 4,878,003 A | 10/1989 | Knepper |
| 4,886,570 A | 12/1989 | Davis |
| 4,918,607 A | 4/1990 | Wible |
| 4,919,224 A | 4/1990 | Shyu |
| 4,922,559 A | 5/1990 | Wall |
| 4,959,192 A | 9/1990 | Trundle |
| 4,962,453 A | 10/1990 | Pong |
| 4,989,818 A | 2/1991 | Trundle |
| 5,001,635 A | 3/1991 | Yasutomi |
| 5,006,302 A | 4/1991 | Trundle |
| 5,023,444 A | 6/1991 | Ohman |
| 5,032,775 A | 7/1991 | Mizuno |
| 5,034,673 A | 7/1991 | Shoji |
| 5,042,861 A | 8/1991 | Trundle |
| 5,045,118 A | 9/1991 | Mason |
| 5,086,535 A | 2/1992 | Grossmeyer |
| 5,095,577 A | 3/1992 | Jonas |
| 5,107,946 A | 4/1992 | Kamimura |
| 5,155,683 A | 10/1992 | Rahim |
| 5,243,732 A | 9/1993 | Koharagi |
| 5,245,177 A | 9/1993 | Schiller |
| 5,276,933 A | 1/1994 | Hennessey |
| 5,279,672 A | 1/1994 | Betker |
| 5,293,955 A | 3/1994 | Lee |
| 5,307,273 A | 4/1994 | Oh |
| 5,309,592 A | 5/1994 | Hiratsuka |
| 5,341,540 A | 8/1994 | Soupert |
| 5,345,639 A | 9/1994 | Tanoue |
| 5,349,378 A | 9/1994 | FereydounMaali |
| 5,353,224 A | 10/1994 | Lee |
| 5,367,458 A | 11/1994 | Roberts et al. |
| 5,369,347 A | 11/1994 | Yoo |
| 5,377,106 A | 12/1994 | Drunk |
| 5,390,627 A | 2/1995 | van der Berg |
| 5,398,632 A | 3/1995 | Goldbach |
| 5,402,051 A | 3/1995 | Fujiwara |
| 5,440,216 A | 8/1995 | Kim |
| 5,444,965 A | 8/1995 | Colens |
| 5,446,356 A | 8/1995 | Kim |
| 5,454,129 A | 10/1995 | Kell |
| 5,518,552 A | 5/1996 | Tanoue |
| 5,534,762 A | 7/1996 | Kim |
| 5,548,511 A | 8/1996 | Bancroft |
| 5,560,077 A | 10/1996 | Crotchett |
| 5,568,589 A | 10/1996 | Hwang |
| 5,621,291 A | 4/1997 | Lee |
| 5,634,237 A | 6/1997 | Paranjpe |
| 5,646,494 A | 7/1997 | Han |
| 5,666,689 A | 9/1997 | Andersen |
| 5,682,313 A | 10/1997 | Edlund |
| 5,682,640 A | 11/1997 | Han |
| 5,687,294 A | 11/1997 | Jeong |
| 5,698,957 A | 12/1997 | Sowada |
| 5,745,946 A | 5/1998 | Thrasher |
| 5,758,298 A | 5/1998 | Guldner |
| 5,778,554 A | 7/1998 | Jones |
| 5,781,960 A | 7/1998 | Kilstrom |
| 5,787,545 A | 8/1998 | Colens |
| 5,815,880 A | 10/1998 | Nakanishi |
| 5,825,981 A | 10/1998 | Matsuda |
| 5,841,259 A | 11/1998 | Kim |
| 5,852,984 A | 12/1998 | Matsuyama |
| 5,867,800 A | 2/1999 | Leif |
| 5,890,250 A | 4/1999 | Lange |
| 5,896,488 A | 4/1999 | Jeong |
| 5,903,124 A | 5/1999 | Kawakami |
| 5,926,909 A | 7/1999 | McGee |
| 5,933,902 A | 8/1999 | Frey |
| 5,935,179 A | 8/1999 | Kleiner |
| 5,940,927 A | 8/1999 | Haegermarck |
| 5,942,869 A | 8/1999 | Katou |
| 5,947,051 A | 9/1999 | Geiger |
| 5,959,423 A | 9/1999 | Nakanishi |
| 5,959,424 A | 9/1999 | Elkmann |
| 5,966,765 A | 10/1999 | Hamada |
| RE36,391 E | 11/1999 | vandenBerg |
| 5,983,833 A | 11/1999 | van der Lely |
| 5,987,696 A | 11/1999 | Wang |
| 5,991,951 A | 11/1999 | Kubo |
| 5,995,884 A | 11/1999 | Allen |
| 5,997,670 A | 12/1999 | Walter |
| 5,999,865 A | 12/1999 | Bloomquist et al. |
| 6,012,470 A | 1/2000 | Jones |
| 6,024,107 A | 2/2000 | Jones |
| 6,064,926 A | 5/2000 | Sarangapani |
| 6,076,662 A | 6/2000 | Bahten |
| 6,082,377 A | 7/2000 | Frey |
| 6,124,694 A | 9/2000 | Bancroft |
| 6,142,252 A | 11/2000 | Kinto |
| 6,176,067 B1 | 1/2001 | Bahten |
| 6,213,136 B1 | 4/2001 | Jones |
| 6,226,830 B1 | 5/2001 | Hendriks |
| 6,230,360 B1 | 5/2001 | Singleton |
| 6,251,551 B1 | 6/2001 | Kunze-Concewitz |
| 6,255,793 B1 | 7/2001 | Peless |
| 6,263,989 B1 | 7/2001 | Won |
| 6,300,737 B1 | 10/2001 | Bergvall |
| 6,311,366 B1 | 11/2001 | Sepke |
| 6,327,741 B1 | 12/2001 | Reed |
| 6,339,735 B1 | 1/2002 | Peless |
| 6,358,325 B1 | 3/2002 | Andreas |
| 6,360,801 B1 | 3/2002 | Walter |
| 6,370,452 B1 | 4/2002 | Pfister |
| 6,370,453 B2 | 4/2002 | Sommer |
| 6,374,157 B1* | 4/2002 | Takamura .............. B25J 9/1674 |
| | | 318/568.12 |
| 6,381,801 B1 | 5/2002 | Clemons, Sr. |
| 6,389,329 B1 | 5/2002 | Colens |
| 6,413,149 B1 | 7/2002 | Wada |
| 6,417,641 B2 | 7/2002 | Peless |
| 6,431,296 B1 | 8/2002 | Won |
| 6,438,456 B1 | 8/2002 | Feddema |
| 6,443,509 B1 | 9/2002 | Levin |
| 6,457,199 B1 | 10/2002 | Frost |
| 6,457,206 B1 | 10/2002 | Judson |
| 6,459,955 B1 | 10/2002 | Bartsch |
| 6,465,982 B1 | 10/2002 | Bergvall |
| 6,481,515 B1 | 11/2002 | Kirkpatrick |
| 6,482,678 B1 | 11/2002 | Frost |
| 6,493,612 B1 | 12/2002 | Bisset |
| 6,493,613 B2 | 12/2002 | Peless |
| 6,496,754 B2 | 12/2002 | Song |
| 6,504,610 B1 | 1/2003 | Bauer |
| 6,519,804 B1 | 2/2003 | Vujik |
| 6,525,509 B1 | 2/2003 | Petersson |
| D471,243 S | 3/2003 | Cioffi |
| 6,532,404 B2 | 3/2003 | Colens |
| 6,535,793 B2 | 3/2003 | Allard |
| 6,571,415 B2 | 6/2003 | Gerber |
| 6,580,246 B2 | 6/2003 | Jacobs |

(56) References Cited

U.S. PATENT DOCUMENTS

| | | |
|---|---|---|
| 6,581,239 B1 | 6/2003 | Dyson |
| 6,594,844 B2 | 7/2003 | Jones |
| 6,597,143 B2 | 7/2003 | Song |
| 6,601,265 B1 | 8/2003 | Burlington |
| 6,605,156 B1 | 8/2003 | Clark |
| 6,609,962 B1 | 8/2003 | Wakabayashi |
| 6,611,120 B2 | 8/2003 | Song |
| 6,611,318 B2 | 8/2003 | LaPolice |
| 6,615,108 B1 | 9/2003 | Peless |
| 6,615,885 B1 | 9/2003 | Ohm |
| 6,633,150 B1 | 10/2003 | Wallach |
| 6,637,446 B2 | 10/2003 | Frost |
| 6,658,325 B2 | 12/2003 | Zweig |
| 6,661,239 B1 | 12/2003 | Ozick |
| 6,662,889 B2 | 12/2003 | De Fazio |
| 6,667,592 B2 | 12/2003 | Jacobs |
| 6,668,951 B2 | 12/2003 | Won |
| 6,671,592 B1 | 12/2003 | Bisset |
| 6,690,134 B1 | 2/2004 | Jones |
| 6,726,823 B1 | 4/2004 | Wang |
| 6,732,826 B2 | 5/2004 | Song |
| 6,745,431 B2 | 6/2004 | Dijksman |
| 6,748,297 B2 | 6/2004 | Song |
| 6,769,004 B2 | 7/2004 | Barrett |
| 6,774,596 B1 | 8/2004 | Bisset |
| 6,775,871 B1 | 8/2004 | Finch |
| 6,781,338 B2 | 8/2004 | Jones |
| 6,809,490 B2 | 10/2004 | Jones |
| 6,810,305 B2 | 10/2004 | Kirkpatrick, Jr. |
| 6,820,801 B2 | 11/2004 | Kaneko |
| 6,841,963 B2 | 1/2005 | Song |
| 6,845,297 B2 | 1/2005 | Allard |
| 6,850,024 B2 | 2/2005 | Peless |
| 6,859,010 B2 | 2/2005 | Jeon |
| 6,859,976 B2 | 3/2005 | Plankenhorn |
| 6,860,206 B1 | 3/2005 | Rudakevych |
| 6,868,307 B2 | 3/2005 | Song |
| 6,869,633 B2 | 3/2005 | Sus |
| 6,870,792 B2 | 3/2005 | Chiappetta |
| 6,882,334 B1 | 4/2005 | Meyer |
| 6,883,201 B2 | 4/2005 | Jones |
| 6,885,912 B2 | 4/2005 | Peless |
| 6,901,624 B2 | 6/2005 | Mori |
| 6,925,679 B2 | 8/2005 | Wallach |
| D510,066 S | 9/2005 | Hickey |
| 6,938,298 B2 | 9/2005 | Aasen |
| 6,939,208 B2 | 9/2005 | Kamimura |
| 6,940,291 B1 | 9/2005 | Ozick |
| 6,941,199 B1 | 9/2005 | Bottomley |
| 6,942,548 B2 | 9/2005 | Wada |
| 6,956,348 B2 | 10/2005 | Landry |
| 6,957,712 B2 | 10/2005 | Song |
| 6,964,312 B2 | 11/2005 | Maggio |
| 6,965,209 B2 | 11/2005 | Jones |
| 6,967,275 B2 | 11/2005 | Ozick |
| 6,971,140 B2 | 12/2005 | Kim |
| 6,971,141 B1 | 12/2005 | Tak |
| 6,984,952 B2 | 1/2006 | Peless |
| 7,000,623 B2 | 2/2006 | Welsh |
| 7,004,269 B2 | 2/2006 | Song |
| 7,013,200 B2 | 3/2006 | Wakui |
| 7,013,527 B2 | 3/2006 | Thomas, Sr. |
| 7,015,831 B2 | 3/2006 | Karlsson |
| 7,024,278 B2 | 4/2006 | Chiappetta |
| 7,031,805 B2 | 4/2006 | Lee |
| 7,040,968 B2 | 5/2006 | Kamimura |
| 7,042,342 B2 | 5/2006 | Luo |
| 7,043,794 B2 | 5/2006 | Conner |
| 7,050,926 B2 | 5/2006 | Theurer et al. |
| 7,053,578 B2 | 5/2006 | Diehl |
| 7,053,580 B2 | 5/2006 | Aldred |
| 7,054,716 B2 | 5/2006 | McKee |
| 7,059,012 B2 | 6/2006 | Song |
| 7,079,923 B2 | 7/2006 | Abramson |
| 7,082,350 B2 | 7/2006 | Skoog |
| D526,753 S | 8/2006 | Tani |
| 7,085,624 B2 | 8/2006 | Aldred |
| 7,103,449 B2 | 9/2006 | Woo |
| 7,113,847 B2 | 9/2006 | Chmura |
| 7,117,067 B2 | 10/2006 | McLurkin |
| 7,133,745 B2 | 11/2006 | Wang |
| 7,134,164 B2 | 11/2006 | Alton |
| 7,135,992 B2 | 11/2006 | Karlsson |
| 7,143,696 B2 | 12/2006 | Rudakevych |
| 7,145,478 B2 | 12/2006 | Goncalves |
| 7,150,068 B1 | 12/2006 | Ragner |
| 7,155,308 B2 | 12/2006 | Jones |
| 7,155,309 B2 | 12/2006 | Peless |
| 7,162,338 B2 | 1/2007 | Goncalves |
| 7,167,775 B2 | 1/2007 | Abramson |
| 7,173,391 B2 | 2/2007 | Jones |
| 7,174,238 B1 | 2/2007 | Zweig |
| 7,177,737 B2 | 2/2007 | Karlsson |
| 7,184,586 B2 | 2/2007 | Jeon |
| 7,185,396 B2 | 3/2007 | Im |
| 7,185,397 B2 | 3/2007 | Stuchlik |
| 7,188,000 B2 | 3/2007 | Chiappetta |
| 7,196,487 B2 | 3/2007 | Jones |
| 7,199,711 B2 | 4/2007 | Field |
| 7,200,892 B2 | 4/2007 | Kim |
| 7,202,630 B2 | 4/2007 | Dan |
| 7,206,677 B2 | 4/2007 | Hulden |
| 7,207,081 B2 | 4/2007 | Gerber |
| 7,208,892 B2 | 4/2007 | Tondra |
| 7,213,298 B2 | 5/2007 | Cipolla |
| 7,213,663 B2 | 5/2007 | Kim |
| 7,222,390 B2 | 5/2007 | Cipolla |
| 7,225,500 B2 | 6/2007 | Diehl |
| 7,237,298 B2 | 7/2007 | Reindle |
| 7,240,396 B2 | 7/2007 | Thomas, Sr. |
| 7,246,405 B2 | 7/2007 | Yan |
| 7,248,951 B2 | 7/2007 | Hulden |
| 7,251,853 B2 | 8/2007 | Park |
| 7,254,464 B1 | 8/2007 | McLurkin |
| 7,254,859 B2 | 8/2007 | Gerber |
| 7,269,877 B2 | 9/2007 | Tondra |
| 7,272,467 B2 | 9/2007 | Goncalves |
| 7,272,868 B2 | 9/2007 | Im |
| 7,274,167 B2 | 9/2007 | Kim |
| 7,275,280 B2 | 10/2007 | Haegermarck |
| 7,288,912 B2 | 10/2007 | Landry |
| D556,961 S | 12/2007 | Swyst |
| 7,303,776 B2 | 12/2007 | Sus |
| 7,324,870 B2 | 1/2008 | Lee |
| 7,331,436 B1 | 2/2008 | Pack |
| 7,332,890 B2 | 2/2008 | Cohen |
| 7,343,221 B2 | 3/2008 | Ann |
| 7,343,719 B2 | 3/2008 | Sus |
| 7,346,428 B1 | 3/2008 | Huffman |
| 7,349,759 B2 | 3/2008 | Peless |
| 7,359,766 B2 | 4/2008 | Jeon |
| 7,363,994 B1 | 4/2008 | DeFazio |
| 7,369,460 B2 | 5/2008 | Chiappetta |
| 7,372,004 B2 | 5/2008 | Buchner |
| 7,388,343 B2 | 6/2008 | Jones |
| 7,389,156 B2 | 6/2008 | Ziegler |
| 7,389,166 B2 | 6/2008 | Harwig |
| 7,402,974 B2 * | 7/2008 | Jeon .................. G05D 1/021 180/65.1 |
| 7,403,360 B2 | 7/2008 | Cunningham |
| 7,412,748 B2 | 8/2008 | Lee |
| 7,417,404 B2 | 8/2008 | Lee |
| 7,418,762 B2 | 9/2008 | Arai |
| 7,424,766 B2 | 9/2008 | Reindle |
| 7,429,843 B2 | 9/2008 | Jones |
| 7,430,455 B2 | 9/2008 | Casey |
| 7,438,766 B2 | 10/2008 | Song |
| 7,441,298 B2 | 10/2008 | Svendsen |
| 7,444,206 B2 | 10/2008 | Abramson |
| 7,448,113 B2 | 11/2008 | Jones |
| 7,459,871 B2 | 12/2008 | Landry |
| 7,464,157 B2 | 12/2008 | Okude |
| 7,474,941 B2 | 1/2009 | Kim |
| 7,480,958 B2 | 1/2009 | Song |

(56) References Cited

U.S. PATENT DOCUMENTS

| | | |
|---|---|---|
| 7,480,960 B2 | 1/2009 | Kim |
| D586,959 S | 2/2009 | Geringer |
| 7,489,277 B2 | 2/2009 | Sung |
| 7,489,985 B2 | 2/2009 | Ko |
| 7,499,774 B2 | 3/2009 | Barrett |
| 7,499,775 B2 | 3/2009 | Filippov |
| 7,499,776 B2 | 3/2009 | Allard |
| 7,499,804 B2 | 3/2009 | Svendsen |
| 7,503,096 B2 | 3/2009 | Lin |
| 7,515,991 B2 | 4/2009 | Egawa |
| D593,265 S | 5/2009 | Carr |
| 7,539,557 B2 | 5/2009 | Yamauchi |
| 7,546,891 B2 | 6/2009 | Won |
| 7,546,912 B1 | 6/2009 | Pack |
| 7,555,363 B2 | 6/2009 | Augenbraun |
| 7,556,108 B2 | 7/2009 | Won |
| 7,559,269 B2 | 7/2009 | Rudakevych |
| 7,564,571 B2 | 7/2009 | Karabassi |
| 7,566,839 B2 | 7/2009 | Hukuba |
| 7,567,052 B2 | 7/2009 | Jones |
| 7,568,259 B2 | 8/2009 | Yan |
| 7,568,536 B2 | 8/2009 | Yu |
| 7,571,511 B2 | 8/2009 | Jones |
| 7,573,403 B2 | 8/2009 | Goncalves |
| 7,574,282 B2 | 8/2009 | Petersson |
| 7,578,020 B2 | 8/2009 | Jaworski |
| 7,579,803 B2 | 8/2009 | Jones |
| 7,581,282 B2 | 9/2009 | Woo |
| 7,597,162 B2 | 10/2009 | Won |
| 7,600,521 B2 | 10/2009 | Woo |
| 7,600,593 B2 | 10/2009 | Filippov |
| 7,603,744 B2 | 10/2009 | Reindle |
| 7,604,675 B2 | 10/2009 | Makarov |
| 7,610,651 B2 | 11/2009 | Baek |
| 7,613,543 B2 | 11/2009 | Petersson |
| 7,620,476 B2 | 11/2009 | Morse |
| 7,636,982 B2 | 12/2009 | Jones |
| 7,647,144 B2 | 1/2010 | Haegermarck |
| 7,650,666 B2 | 1/2010 | Jang |
| 7,654,348 B2 | 2/2010 | Ohm |
| 7,660,650 B2 | 2/2010 | Kawagoe |
| 7,663,333 B2 | 2/2010 | Jones |
| 7,673,367 B2 | 3/2010 | Kim |
| 7,679,532 B2 | 3/2010 | Karlsson |
| 7,688,676 B2 | 3/2010 | Chiappetta |
| 7,693,654 B1 | 4/2010 | Dietsch |
| 7,697,141 B2 | 4/2010 | Jones |
| 7,706,917 B1 | 4/2010 | Chiappetta |
| 7,706,921 B2 | 4/2010 | Jung |
| 7,709,497 B2 | 5/2010 | Christensen, IV |
| 7,711,450 B2 | 5/2010 | Im |
| 7,720,572 B2 | 5/2010 | Ziegler |
| 7,721,829 B2 | 5/2010 | Lee |
| 7,729,801 B2 | 6/2010 | Abramson |
| 7,749,294 B2 | 7/2010 | Oh |
| 7,751,940 B2 | 7/2010 | Lee |
| 7,761,954 B2 | 7/2010 | Ziegler |
| 7,765,635 B2 | 8/2010 | Park |
| 7,765,638 B2 | 8/2010 | Pineschi et al. |
| 7,769,490 B2 | 8/2010 | Abramson |
| 7,774,158 B2 | 8/2010 | Domingues Goncalves |
| 7,779,504 B2 | 8/2010 | Lee |
| 7,780,796 B2 | 8/2010 | Shim |
| 7,784,139 B2 | 8/2010 | Sawalski |
| 7,784,570 B2 | 8/2010 | Couture |
| 7,785,544 B2 | 8/2010 | Alward |
| 7,787,991 B2 | 8/2010 | Jeung |
| 7,793,614 B2 | 9/2010 | Ericsson |
| 7,801,645 B2 | 9/2010 | Taylor |
| 7,805,220 B2 | 9/2010 | Taylor |
| 7,827,653 B1 | 11/2010 | Liu |
| 7,832,048 B2 | 11/2010 | Harwig |
| 7,835,529 B2 | 11/2010 | Hernandez |
| 7,843,431 B2 | 11/2010 | Robbins |
| 7,844,364 B2 | 11/2010 | McLurkin |
| 7,849,555 B2 | 12/2010 | Hahm |
| 7,856,291 B2 | 12/2010 | Jung |
| 7,860,608 B2 | 12/2010 | Lee |
| 7,861,365 B2 | 1/2011 | Sun |
| 7,861,366 B2 | 1/2011 | Hahm |
| 7,873,437 B2 | 1/2011 | Aldred |
| 7,877,166 B2 | 1/2011 | Harwig |
| 7,886,399 B2 | 2/2011 | Dayton |
| 7,890,210 B2 | 2/2011 | Choi |
| 7,891,045 B2 | 2/2011 | Kim |
| 7,891,289 B2 | 2/2011 | Day |
| 7,891,446 B2 | 2/2011 | Couture |
| 7,894,951 B2 | 2/2011 | Norris |
| 7,916,931 B2 | 3/2011 | Lee |
| 7,920,941 B2 | 4/2011 | Park |
| 7,921,506 B2 | 4/2011 | Baek |
| 7,926,598 B2 | 4/2011 | Rudakevych |
| 7,934,571 B2 | 5/2011 | Chiu |
| 7,937,800 B2 | 5/2011 | Yan |
| 7,942,107 B2 | 5/2011 | Vosburgh |
| 7,957,837 B2 | 6/2011 | Ziegler |
| 7,962,997 B2 | 6/2011 | Chung |
| 7,966,339 B2 | 6/2011 | Kim |
| 7,975,790 B2 | 7/2011 | Kim |
| 7,979,175 B2 | 7/2011 | Allard |
| 7,979,945 B2 | 7/2011 | Dayton |
| 7,981,455 B2 | 7/2011 | Sus |
| 7,997,118 B2 | 8/2011 | Mecca |
| 8,001,651 B2 | 8/2011 | Chang |
| 8,007,221 B1 | 8/2011 | More |
| 8,010,229 B2 | 8/2011 | Kim |
| 8,019,223 B2 | 9/2011 | Hudson |
| 8,020,657 B2 | 9/2011 | Allard |
| 8,032,978 B2 | 10/2011 | Haegermarck |
| 8,034,390 B2 | 10/2011 | Sus |
| 8,042,663 B1 | 10/2011 | Pack |
| 8,046,103 B2 | 10/2011 | Abramson |
| 8,061,461 B2 | 11/2011 | Couture |
| 8,065,778 B2 | 11/2011 | Kim |
| 8,073,439 B2 | 12/2011 | Stromberg |
| 8,074,752 B2 | 12/2011 | Rudakevych |
| 8,078,338 B2 | 12/2011 | Pack |
| 8,079,432 B2 | 12/2011 | Ohm |
| 8,082,836 B2 | 12/2011 | More |
| 8,086,419 B2 | 12/2011 | Goncalves |
| 8,087,117 B2 | 1/2012 | Kapoor |
| 8,095,238 B2 | 1/2012 | Jones |
| 8,095,336 B2 | 1/2012 | Goncalves |
| 8,107,318 B2 | 1/2012 | Chiappetta |
| 8,108,092 B2 | 1/2012 | Phillips |
| 8,109,191 B1 | 2/2012 | Rudakevych |
| 8,112,942 B2 | 2/2012 | Bohm |
| 8,113,304 B2 | 2/2012 | Won |
| 8,122,982 B2 | 2/2012 | Morey |
| 8,127,396 B2 | 3/2012 | Mangiardi |
| 8,127,399 B2 | 3/2012 | Dilger |
| 8,127,704 B2 | 3/2012 | Vosburgh |
| 8,136,200 B2 | 3/2012 | Splinter |
| 8,150,650 B2 | 4/2012 | Goncalves |
| D659,311 S | 5/2012 | Geringer |
| 8,166,904 B2 | 5/2012 | Israel |
| 8,195,333 B2 | 6/2012 | Ziegler |
| 8,196,251 B2 | 6/2012 | Lynch |
| 8,199,109 B2 | 6/2012 | Robbins |
| 8,200,600 B2 | 6/2012 | Rosenstein |
| 8,200,700 B2 | 6/2012 | Moore |
| 8,237,389 B2 | 8/2012 | Fitch |
| 8,237,920 B2 | 8/2012 | Jones |
| 8,239,992 B2 | 8/2012 | Schnittman |
| 8,244,469 B2 | 8/2012 | Cheung |
| 8,253,368 B2 | 8/2012 | Landry |
| 8,255,092 B2 | 8/2012 | Phillips |
| 8,256,542 B2 | 9/2012 | Couture |
| 8,265,793 B2 | 9/2012 | Cross |
| 8,274,406 B2 | 9/2012 | Karlsson |
| 8,281,703 B2 | 10/2012 | Moore |
| 8,281,731 B2 | 10/2012 | Vosburgh |
| 8,290,619 B2 | 10/2012 | McLurkin |
| 8,292,007 B2 | 10/2012 | DeFazio |

(56) References Cited

U.S. PATENT DOCUMENTS

| | | |
|---|---|---|
| 8,295,125 B2 | 10/2012 | Chiappetta |
| D670,877 S | 11/2012 | Geringer |
| 8,308,529 B2 | 11/2012 | DAmbra |
| 8,311,674 B2 | 11/2012 | Abramson |
| 8,316,971 B2 | 11/2012 | Couture |
| 8,318,499 B2 | 11/2012 | Fritchie |
| D672,928 S | 12/2012 | Swett |
| 8,322,470 B2 | 12/2012 | Ohm |
| 8,326,469 B2 | 12/2012 | Phillips |
| 8,327,960 B2 | 12/2012 | Couture |
| 8,336,479 B2 | 12/2012 | Vosburgh |
| 8,342,271 B2 | 1/2013 | Filippov |
| 8,347,088 B2 | 1/2013 | Moore |
| 8,347,444 B2 | 1/2013 | Schnittman |
| 8,350,810 B2 | 1/2013 | Robbins |
| 8,353,373 B2 | 1/2013 | Rudakevych |
| 8,364,309 B1 | 1/2013 | Bailey |
| 8,364,310 B2 | 1/2013 | Jones |
| 8,365,848 B2 | 2/2013 | Won |
| 8,368,339 B2 | 2/2013 | Jones |
| 8,370,985 B2 | 2/2013 | Schnittman |
| 8,374,721 B2 | 2/2013 | Halloran |
| 8,375,838 B2 | 2/2013 | Rudakevych |
| 8,378,613 B2 | 2/2013 | Landry |
| 8,380,350 B2 | 2/2013 | Ozick |
| 8,382,906 B2 | 2/2013 | Konandreas |
| 8,386,081 B2 | 2/2013 | Landry |
| 8,387,193 B2 | 3/2013 | Ziegler |
| 8,390,251 B2 | 3/2013 | Cohen |
| 8,392,021 B2 | 3/2013 | Konandreas |
| 8,396,592 B2 | 3/2013 | Jones |
| 8,396,611 B2 | 3/2013 | Phillips |
| 8,402,586 B2 | 3/2013 | Lavabre |
| 8,408,956 B1 | 4/2013 | Vosburgh |
| 8,412,377 B2 | 4/2013 | Casey |
| 8,413,752 B2 | 4/2013 | Page |
| 8,417,188 B1 | 4/2013 | Vosburgh |
| 8,417,383 B2 | 4/2013 | Ozick |
| 8,418,303 B2 | 4/2013 | Kapoor |
| 8,418,642 B2 | 4/2013 | Vosburgh |
| 8,428,778 B2 | 4/2013 | Landry |
| 8,433,442 B2 | 4/2013 | Friedman |
| D682,362 S | 5/2013 | Mozeika |
| 8,438,694 B2 | 5/2013 | Kim |
| 8,438,695 B2 | 5/2013 | Gilbert, Jr. |
| 8,438,698 B2 | 5/2013 | Kim |
| 8,447,440 B2 | 5/2013 | Phillips |
| 8,447,613 B2 | 5/2013 | Hussey |
| 8,452,448 B2 | 5/2013 | Pack |
| 8,453,289 B2 | 6/2013 | Lynch |
| 8,456,125 B2 | 6/2013 | Landry |
| 8,461,803 B2 | 6/2013 | Cohen |
| 8,463,438 B2 | 6/2013 | Jones |
| 8,473,140 B2 | 6/2013 | Norris |
| 8,474,090 B2 | 7/2013 | Jones |
| 8,478,442 B2 | 7/2013 | Casey |
| 8,485,330 B2 | 7/2013 | Pack |
| 8,505,158 B2 | 8/2013 | Han |
| 8,508,388 B2 | 8/2013 | Karlsson |
| 8,515,578 B2 | 8/2013 | Chiappetta |
| 8,516,651 B2 | 8/2013 | Jones |
| 8,525,995 B2 | 9/2013 | Jones |
| 8,527,113 B2 | 9/2013 | Yamauchi |
| 8,528,157 B2 | 9/2013 | Schnittman |
| 8,528,162 B2 | 9/2013 | Tang |
| 8,528,673 B2 | 9/2013 | More |
| 8,532,822 B2 | 9/2013 | Abramson |
| 8,533,144 B1 | 9/2013 | Reeser |
| 8,534,983 B2 | 9/2013 | Schoenfeld |
| 8,543,562 B2 | 9/2013 | Mule |
| 8,548,626 B2 | 10/2013 | Steitz |
| 8,551,254 B2 | 10/2013 | Dayton |
| 8,551,421 B2 | 10/2013 | Luchinger |
| 8,565,920 B2 | 10/2013 | Casey |
| 8,572,799 B2 | 11/2013 | Won |
| 8,584,305 B2 | 11/2013 | Won |
| 8,584,306 B2 | 11/2013 | Chung |
| 8,584,307 B2 | 11/2013 | Won |
| 8,594,840 B1 | 11/2013 | Chiappetta |
| 8,598,829 B2 | 12/2013 | Landry |
| 8,599,645 B2 | 12/2013 | Chiappetta |
| 8,600,553 B2 | 12/2013 | Svendsen |
| 8,606,401 B2 | 12/2013 | Ozick |
| 8,634,956 B1 | 1/2014 | Chiappetta |
| 8,634,958 B1 | 1/2014 | Chiappetta |
| 8,666,523 B2 | 3/2014 | Kim |
| 8,671,513 B2 | 3/2014 | Yoo et al. |
| 8,732,895 B2 | 5/2014 | Cunningham |
| 8,741,013 B2 | 6/2014 | Swett et al. |
| 8,743,286 B2 | 6/2014 | Hasegawa |
| 8,745,194 B2 | 6/2014 | Uribe-Etxebarria Jimenez |
| 8,755,936 B2 | 6/2014 | Friedman |
| 8,761,931 B2 | 6/2014 | Halloran |
| 8,763,200 B2 | 7/2014 | Kim |
| 8,774,970 B2 | 7/2014 | Knopow |
| 8,798,791 B2 | 8/2014 | Li |
| 8,798,792 B2 | 8/2014 | Park |
| 8,799,258 B2 | 8/2014 | Mule |
| 8,838,274 B2 | 9/2014 | Jones |
| 8,839,477 B2 | 9/2014 | Schnittman |
| 8,843,245 B2 | 9/2014 | Choe |
| 8,855,914 B1 | 10/2014 | Alexander |
| 8,874,264 B1 | 10/2014 | Chiappetta |
| 8,881,339 B2 | 11/2014 | Gilbert, Jr. et al. |
| 8,924,042 B2 | 12/2014 | Kim |
| 8,961,695 B2 | 2/2015 | Romanov |
| 8,985,127 B2 | 3/2015 | Konandreas |
| 8,996,172 B2 | 3/2015 | Shah et al. |
| 9,033,079 B2 | 5/2015 | Shin |
| 9,037,396 B2 | 5/2015 | Pack |
| 9,104,206 B2 | 8/2015 | Biber et al. |
| 9,144,361 B2 | 9/2015 | Landry |
| 9,259,129 B2 | 2/2016 | Jang et al. |
| 9,360,300 B2 | 6/2016 | DiBernado |
| 9,629,514 B2 | 4/2017 | Hillen et al. |
| 9,687,132 B2 | 6/2017 | Schlischka |
| 9,939,529 B2 | 4/2018 | Haegermarck |
| 10,045,675 B2 | 8/2018 | Haegermarck |
| 10,247,669 B2 | 4/2019 | Windorfer |
| 10,296,007 B2 | 5/2019 | Vicenti |
| 2001/0004719 A1 | 6/2001 | Sommer |
| 2001/0037163 A1 | 11/2001 | Allard |
| 2002/0016649 A1 | 2/2002 | Jones |
| 2002/0091466 A1 | 7/2002 | Song |
| 2002/0108635 A1 | 8/2002 | Marrero |
| 2002/0121288 A1 | 9/2002 | Marrero |
| 2002/0121561 A1 | 9/2002 | Marrero |
| 2002/0164932 A1 | 11/2002 | Kamimura |
| 2002/0174506 A1 | 11/2002 | Wallach |
| 2002/0185071 A1 | 12/2002 | Guo |
| 2002/0189871 A1 | 12/2002 | Won |
| 2003/0000034 A1 | 1/2003 | Welsh |
| 2003/0025472 A1 | 2/2003 | Jones |
| 2003/0030398 A1 | 2/2003 | Jacobs |
| 2003/0120972 A1 | 6/2003 | Matsushima |
| 2003/0159223 A1 | 8/2003 | Plankenhorn |
| 2003/0167000 A1 | 9/2003 | Mullick |
| 2003/0229421 A1 | 12/2003 | Chmura |
| 2004/0020000 A1 | 2/2004 | Jones |
| 2004/0031111 A1 | 2/2004 | Porchia |
| 2004/0031121 A1 | 2/2004 | Martin |
| 2004/0034952 A1 | 2/2004 | Ho |
| 2004/0049877 A1 | 3/2004 | Jones |
| 2004/0049878 A1 | 3/2004 | Thomas |
| 2004/0074038 A1 | 4/2004 | Im |
| 2004/0074039 A1 | 4/2004 | Kim |
| 2004/0098167 A1 | 5/2004 | Yi |
| 2004/0111184 A1 | 6/2004 | Chiappetta |
| 2004/0111827 A1 | 6/2004 | Im |
| 2004/0167667 A1 | 8/2004 | Goncalves |
| 2004/0181896 A1 | 9/2004 | Egawa |
| 2004/0182839 A1 | 9/2004 | Denney |
| 2004/0182840 A1 | 9/2004 | Denney |
| 2004/0185011 A1 | 9/2004 | Alexander |

(56) References Cited

U.S. PATENT DOCUMENTS

| | | |
|---|---|---|
| 2004/0187249 A1 | 9/2004 | Jones |
| 2004/0207355 A1 | 10/2004 | Jones |
| 2004/0208212 A1 | 10/2004 | Denney |
| 2004/0210343 A1 | 10/2004 | Kim |
| 2004/0220707 A1 | 11/2004 | Pallister |
| 2005/0000543 A1 | 1/2005 | Taylor et al. |
| 2005/0010331 A1 | 1/2005 | Taylor |
| 2005/0015912 A1 | 1/2005 | Kim |
| 2005/0015915 A1 | 1/2005 | Thomas |
| 2005/0021181 A1 * | 1/2005 | Kim ............ G05D 1/0227 700/245 |
| 2005/0028315 A1 | 2/2005 | Thomas |
| 2005/0028316 A1 | 2/2005 | Thomas |
| 2005/0042151 A1 | 2/2005 | Alward |
| 2005/0065662 A1 | 3/2005 | Reindle |
| 2005/0085947 A1 | 4/2005 | Aldred |
| 2005/0088643 A1 | 4/2005 | Anderson |
| 2005/0156562 A1 | 7/2005 | Cohen |
| 2005/0166354 A1 | 8/2005 | Uehigashi |
| 2005/0191949 A1 | 9/2005 | Kamimura |
| 2005/0217061 A1 | 10/2005 | Reindle |
| 2005/0223514 A1 | 10/2005 | Stuchlik |
| 2005/0229340 A1 | 10/2005 | Sawalski |
| 2005/0230166 A1 | 10/2005 | Petersson |
| 2005/0234611 A1 | 10/2005 | Uehigashi |
| 2005/0251292 A1 | 11/2005 | Casey |
| 2005/0251457 A1 | 11/2005 | Kashiwagi |
| 2005/0251947 A1 | 11/2005 | Lee |
| 2005/0267629 A1 | 12/2005 | Petersson |
| 2005/0278888 A1 | 12/2005 | Reindle |
| 2005/0287038 A1 | 12/2005 | Dubrovsky |
| 2006/0009879 A1 | 1/2006 | Lynch |
| 2006/0010799 A1 | 1/2006 | Bohm |
| 2006/0020369 A1 | 1/2006 | Taylor |
| 2006/0028306 A1 | 2/2006 | Hukuba |
| 2006/0032013 A1 | 2/2006 | Kim |
| 2006/0045981 A1 | 3/2006 | Tsushi |
| 2006/0076039 A1 | 4/2006 | Song et al. |
| 2006/0095158 A1 | 5/2006 | Lee |
| 2006/0136096 A1 | 6/2006 | Chiappetta |
| 2006/0144834 A1 | 7/2006 | Denney |
| 2006/0178777 A1 | 8/2006 | Park |
| 2006/0190133 A1 | 8/2006 | Konandreas |
| 2006/0190134 A1 | 8/2006 | Ziegler |
| 2006/0190146 A1 | 8/2006 | Morse |
| 2006/0195015 A1 | 8/2006 | Mullick |
| 2006/0200281 A1 | 9/2006 | Ziegler |
| 2006/0213025 A1 | 9/2006 | Sawalski |
| 2006/0235570 A1 | 10/2006 | Jung |
| 2006/0235585 A1 | 10/2006 | Tanaka |
| 2006/0236492 A1 | 10/2006 | Sudo |
| 2006/0288519 A1 | 12/2006 | Jaworski |
| 2006/0293788 A1 | 12/2006 | Pogodin |
| 2007/0016328 A1 | 1/2007 | Ziegler |
| 2007/0021867 A1 | 1/2007 | Woo |
| 2007/0059441 A1 | 3/2007 | Greer |
| 2007/0061040 A1 | 3/2007 | Augenbraun |
| 2007/0114975 A1 | 5/2007 | Cohen |
| 2007/0118248 A1 | 5/2007 | Lee et al. |
| 2007/0124890 A1 | 6/2007 | Erko |
| 2007/0143950 A1 | 6/2007 | Lin |
| 2007/0156286 A1 | 7/2007 | Yamauchi |
| 2007/0179670 A1 | 8/2007 | Chiappetta |
| 2007/0189347 A1 | 8/2007 | Denney |
| 2007/0204426 A1 | 9/2007 | Nakagawa |
| 2007/0213892 A1 | 9/2007 | Jones |
| 2007/0214601 A1 | 9/2007 | Chung |
| 2007/0234492 A1 | 10/2007 | Svendsen |
| 2007/0244610 A1 | 10/2007 | Ozick |
| 2007/0266508 A1 | 11/2007 | Jones |
| 2007/0267230 A1 | 11/2007 | Won |
| 2007/0267570 A1 | 11/2007 | Park |
| 2007/0267998 A1 | 11/2007 | Cohen |
| 2007/0273864 A1 | 11/2007 | Cho |
| 2007/0276541 A1 | 11/2007 | Sawasaki |
| 2007/0285041 A1 | 12/2007 | Jones |
| 2007/0289267 A1 | 12/2007 | Makarov |
| 2007/0290649 A1 | 12/2007 | Jones |
| 2008/0000041 A1 | 1/2008 | Jones |
| 2008/0000042 A1 | 1/2008 | Jones |
| 2008/0001566 A1 | 1/2008 | Jones |
| 2008/0007203 A1 | 1/2008 | Cohen |
| 2008/0009964 A1 | 1/2008 | Bruemmer et al. |
| 2008/0015738 A1 | 1/2008 | Casey |
| 2008/0016631 A1 | 1/2008 | Casey |
| 2008/0037170 A1 | 2/2008 | Saliba |
| 2008/0039974 A1 | 2/2008 | Sandin |
| 2008/0047092 A1 | 2/2008 | Schnittman |
| 2008/0051953 A1 | 2/2008 | Jones |
| 2008/0007193 A1 | 3/2008 | Bow |
| 2008/0052846 A1 | 3/2008 | Kapoor |
| 2008/0058987 A1 | 3/2008 | Ozick |
| 2008/0063400 A1 | 3/2008 | Hudson |
| 2008/0065265 A1 | 3/2008 | Ozick |
| 2008/0077278 A1 | 3/2008 | Park |
| 2008/0079383 A1 | 4/2008 | Nakamoto |
| 2008/0084174 A1 | 4/2008 | Jones |
| 2008/0086241 A1 | 4/2008 | Phillips |
| 2008/0091304 A1 | 4/2008 | Ozick |
| 2008/0091305 A1 | 4/2008 | Svendsen |
| 2008/0093131 A1 | 4/2008 | Couture |
| 2008/0098553 A1 | 5/2008 | Dayton |
| 2008/0105445 A1 | 5/2008 | Dayton |
| 2008/0109126 A1 | 5/2008 | Sandin |
| 2008/0121097 A1 | 5/2008 | Rudakevych |
| 2008/0127445 A1 | 6/2008 | Konandreas |
| 2008/0127446 A1 | 6/2008 | Ziegler |
| 2008/0133052 A1 | 6/2008 | Jones |
| 2008/0134457 A1 | 6/2008 | Morse |
| 2008/0134458 A1 | 6/2008 | Ziegler |
| 2008/0140255 A1 | 6/2008 | Ziegler |
| 2008/0143063 A1 | 6/2008 | Won |
| 2008/0143064 A1 | 6/2008 | Won |
| 2008/0143065 A1 | 6/2008 | DeFazio |
| 2008/0152871 A1 | 6/2008 | Greer |
| 2008/0155768 A1 | 7/2008 | Ziegler |
| 2008/0179115 A1 | 7/2008 | Ohm |
| 2008/0183332 A1 | 7/2008 | Ohm |
| 2008/0184518 A1 | 8/2008 | Taylor |
| 2008/0196946 A1 | 8/2008 | Filippov |
| 2008/0205194 A1 | 8/2008 | Chiappetta |
| 2008/0209665 A1 | 9/2008 | Mangiardi |
| 2008/0221729 A1 | 9/2008 | Lavarec |
| 2008/0223630 A1 | 9/2008 | Couture |
| 2008/0235897 A1 | 10/2008 | Kim |
| 2008/0236907 A1 | 10/2008 | Won |
| 2008/0264456 A1 | 10/2008 | Lynch |
| 2008/0266254 A1 | 10/2008 | Robbins |
| 2008/0276407 A1 | 11/2008 | Schnittman |
| 2008/0276408 A1 | 11/2008 | Gilbert |
| 2008/0281470 A1 | 11/2008 | Gilbert |
| 2008/0282494 A1 | 11/2008 | Won |
| 2008/0294288 A1 | 11/2008 | Yamauchi |
| 2008/0307590 A1 | 12/2008 | Jones |
| 2009/0007366 A1 | 1/2009 | Svendsen |
| 2009/0025155 A1 | 1/2009 | Nishiyama |
| 2009/0030551 A1 | 1/2009 | Hein et al. |
| 2009/0037024 A1 | 2/2009 | Jamieson |
| 2009/0038089 A1 | 2/2009 | Landry |
| 2009/0044370 A1 | 2/2009 | Won |
| 2009/0045766 A1 | 2/2009 | Casey |
| 2009/0055022 A1 | 2/2009 | Casey |
| 2009/0065271 A1 | 3/2009 | Won |
| 2009/0070946 A1 | 3/2009 | Tamada |
| 2009/0078035 A1 | 3/2009 | Mecca |
| 2009/0107738 A1 | 4/2009 | Won |
| 2009/0125175 A1 | 5/2009 | Park |
| 2009/0126143 A1 | 5/2009 | Haegermarck |
| 2009/0133720 A1 | 5/2009 | Vandenbogert |
| 2009/0145671 A1 | 6/2009 | Filippov |
| 2009/0173553 A1 | 7/2009 | Won |
| 2009/0180668 A1 | 7/2009 | Jones |
| 2009/0226113 A1 | 9/2009 | Matsumoto |
| 2009/0232506 A1 | 9/2009 | Hudson |

(56) References Cited

U.S. PATENT DOCUMENTS

| | | |
|---|---|---|
| 2009/0241826 A1 | 10/2009 | Vosburgh |
| 2009/0254217 A1 | 10/2009 | Pack |
| 2009/0254218 A1 | 10/2009 | Sandin |
| 2009/0265036 A1 | 10/2009 | Jamieson |
| 2009/0270015 A1 | 10/2009 | DAmbra |
| 2009/0274602 A1 | 11/2009 | Alward |
| 2009/0281661 A1 | 11/2009 | Dooley et al. |
| 2009/0292393 A1 | 11/2009 | Casey |
| 2009/0292884 A1 | 11/2009 | Wang |
| 2009/0314318 A1 | 12/2009 | Chang |
| 2009/0314554 A1 | 12/2009 | Couture |
| 2009/0319083 A1 | 12/2009 | Jones |
| 2010/0001478 A1 | 1/2010 | DeFazio |
| 2010/0011529 A1 | 1/2010 | Won |
| 2010/0037418 A1 | 2/2010 | Hussey |
| 2010/0049364 A1 | 2/2010 | Landry |
| 2010/0049365 A1 | 2/2010 | Jones |
| 2010/0049391 A1 | 2/2010 | Nakano |
| 2010/0063628 A1 | 3/2010 | Landry |
| 2010/0075054 A1 | 3/2010 | Kaneyama |
| 2010/0076600 A1 | 3/2010 | Cross |
| 2010/0078415 A1 | 4/2010 | Denney |
| 2010/0082193 A1 | 4/2010 | Chiappetta |
| 2010/0107355 A1 | 5/2010 | Won |
| 2010/0108098 A1 | 5/2010 | Splinter |
| 2010/0115716 A1 | 5/2010 | Landry |
| 2010/0116566 A1 | 5/2010 | Ohm |
| 2010/0125968 A1 | 5/2010 | Ho |
| 2010/0139029 A1 | 6/2010 | Kim |
| 2010/0139995 A1 | 6/2010 | Rudakevych |
| 2010/0161225 A1 | 6/2010 | Hyung et al. |
| 2010/0173070 A1 | 7/2010 | Niu |
| 2010/0206336 A1 | 8/2010 | Souid |
| 2010/0217436 A1 | 8/2010 | Jones |
| 2010/0256812 A1* | 10/2010 | Tsusaka ............... A47L 9/2852 700/254 |
| 2010/0257690 A1 | 10/2010 | Jones |
| 2010/0257691 A1 | 10/2010 | Jones |
| 2010/0263142 A1 | 10/2010 | Jones |
| 2010/0263158 A1 | 10/2010 | Jones |
| 2010/0268384 A1 | 10/2010 | Jones |
| 2010/0275405 A1 | 11/2010 | Morse |
| 2010/0286791 A1 | 11/2010 | Goldsmith |
| 2010/0305752 A1 | 12/2010 | Abramson |
| 2010/0312429 A1 | 12/2010 | Jones |
| 2010/0313910 A1 | 12/2010 | Lee |
| 2010/0313912 A1 | 12/2010 | Han |
| 2011/0000363 A1 | 1/2011 | More |
| 2011/0004339 A1 | 1/2011 | Ozick |
| 2011/0010873 A1 | 1/2011 | Kim |
| 2011/0077802 A1 | 3/2011 | Halloran |
| 2011/0082668 A1 | 4/2011 | Escrig |
| 2011/0088609 A1 | 4/2011 | Vosburgh |
| 2011/0109549 A1 | 5/2011 | Robbins |
| 2011/0125323 A1 | 5/2011 | Gutmann et al. |
| 2011/0131741 A1 | 6/2011 | Jones |
| 2011/0154589 A1 | 6/2011 | Reindle |
| 2011/0202175 A1* | 8/2011 | Romanov ............ A47L 11/4011 700/250 |
| 2011/0209726 A1 | 9/2011 | Dayton |
| 2011/0252594 A1 | 10/2011 | Blouin |
| 2011/0258789 A1 | 10/2011 | Lavabre |
| 2011/0271469 A1 | 11/2011 | Ziegler |
| 2011/0277269 A1 | 11/2011 | Kim |
| 2011/0286886 A1 | 11/2011 | Luchinger |
| 2011/0288684 A1 | 11/2011 | Farlow |
| 2012/0011668 A1 | 1/2012 | Schnittman |
| 2012/0011669 A1 | 1/2012 | Schnittman |
| 2012/0011676 A1 | 1/2012 | Jung |
| 2012/0011677 A1 | 1/2012 | Jung |
| 2012/0011992 A1 | 1/2012 | Rudakevych |
| 2012/0036659 A1 | 2/2012 | Ziegler |
| 2012/0047676 A1 | 3/2012 | Jung |
| 2012/0049798 A1 | 3/2012 | Cohen |
| 2012/0079670 A1 | 4/2012 | Yoon |
| 2012/0083924 A1 | 4/2012 | Jones |
| 2012/0084934 A1 | 4/2012 | Li |
| 2012/0084937 A1 | 4/2012 | Won |
| 2012/0084938 A1 | 4/2012 | Fu |
| 2012/0085368 A1 | 4/2012 | Landry |
| 2012/0090133 A1 | 4/2012 | Kim |
| 2012/0095619 A1 | 4/2012 | Pack |
| 2012/0096656 A1 | 4/2012 | Jung |
| 2012/0097783 A1 | 4/2012 | Pack |
| 2012/0101661 A1 | 4/2012 | Phillips |
| 2012/0102670 A1 | 5/2012 | Jang |
| 2012/0109423 A1 | 5/2012 | Pack |
| 2012/0110755 A1 | 5/2012 | Liu |
| 2012/0118216 A1 | 5/2012 | Vosburgh |
| 2012/0125363 A1 | 5/2012 | Kim |
| 2012/0137464 A1 | 6/2012 | Thatcher |
| 2012/0137949 A1 | 6/2012 | Vosburgh |
| 2012/0151709 A1 | 6/2012 | Tang |
| 2012/0152280 A1 | 6/2012 | Bosses |
| 2012/0152877 A1 | 6/2012 | Tadayon |
| 2012/0159725 A1 | 6/2012 | Kapoor |
| 2012/0166024 A1 | 6/2012 | Phillips |
| 2012/0167917 A1 | 7/2012 | Gilbert |
| 2012/0169497 A1 | 7/2012 | Schnittman |
| 2012/0173018 A1 | 7/2012 | Allen |
| 2012/0173070 A1 | 7/2012 | Schnittman |
| 2012/0180254 A1 | 7/2012 | Morse |
| 2012/0180712 A1 | 7/2012 | Vosburgh |
| 2012/0181099 A1 | 7/2012 | Moon |
| 2012/0182392 A1 | 7/2012 | Kearns |
| 2012/0183382 A1 | 7/2012 | Couture |
| 2012/0185091 A1 | 7/2012 | Field |
| 2012/0185094 A1 | 7/2012 | Rosenstein |
| 2012/0185095 A1 | 7/2012 | Rosenstein |
| 2012/0185096 A1 | 7/2012 | Rosenstein |
| 2012/0192898 A1 | 8/2012 | Lynch |
| 2012/0194395 A1 | 8/2012 | Williams |
| 2012/0194427 A1* | 8/2012 | Lee ................... G06F 3/0346 345/157 |
| 2012/0197439 A1 | 8/2012 | Wang |
| 2012/0197464 A1 | 8/2012 | Wang |
| 2012/0199006 A1 | 8/2012 | Swett |
| 2012/0199407 A1 | 8/2012 | Morey |
| 2012/0200149 A1 | 8/2012 | Rudakevych |
| 2012/0222224 A1 | 9/2012 | Yoon |
| 2012/0246862 A1 | 10/2012 | Landry |
| 2012/0260443 A1 | 10/2012 | Lindgren |
| 2012/0260861 A1 | 10/2012 | Lindgren |
| 2012/0261204 A1 | 10/2012 | Won |
| 2012/0265346 A1 | 10/2012 | Gilbert |
| 2012/0265391 A1 | 10/2012 | Letsky |
| 2012/0268587 A1 | 10/2012 | Robbins |
| 2012/0281829 A1 | 11/2012 | Rudakevych |
| 2012/0298029 A1 | 11/2012 | Vosburgh |
| 2012/0303160 A1 | 11/2012 | Ziegler |
| 2012/0311810 A1 | 12/2012 | Gilbert |
| 2012/0312221 A1 | 12/2012 | Vosburgh |
| 2012/0317745 A1 | 12/2012 | Jung |
| 2012/0322349 A1 | 12/2012 | Josi |
| 2013/0015596 A1 | 1/2013 | Mozeika |
| 2013/0025085 A1 | 1/2013 | Kim |
| 2013/0031734 A1 | 2/2013 | Porat |
| 2013/0032078 A1 | 2/2013 | Yahnker |
| 2013/0035793 A1 | 2/2013 | Neumann |
| 2013/0047368 A1 | 2/2013 | Tran |
| 2013/0054029 A1 | 2/2013 | Huang |
| 2013/0054129 A1 | 2/2013 | Wong |
| 2013/0060357 A1 | 3/2013 | Li |
| 2013/0060379 A1 | 3/2013 | Choe |
| 2013/0070563 A1 | 3/2013 | Chiappetta |
| 2013/0081218 A1 | 4/2013 | Kim |
| 2013/0085603 A1 | 4/2013 | Chiappetta |
| 2013/0086760 A1 | 4/2013 | Han |
| 2013/0092190 A1 | 4/2013 | Yoon |
| 2013/0098402 A1 | 4/2013 | Yoon |
| 2013/0103194 A1 | 4/2013 | Jones |
| 2013/0105233 A1 | 5/2013 | Couture |
| 2013/0117952 A1 | 5/2013 | Schnittman |
| 2013/0118524 A1 | 5/2013 | Konandreas |

(56) References Cited

U.S. PATENT DOCUMENTS

| | | |
|---|---|---|
| 2013/0138337 A1 | 5/2013 | Pack |
| 2013/0145572 A1 | 6/2013 | Schregardus |
| 2013/0152724 A1 | 6/2013 | Mozeika |
| 2013/0152970 A1 | 6/2013 | Porat |
| 2013/0160226 A1 | 6/2013 | Lee |
| 2013/0166107 A1 | 6/2013 | Robbins |
| 2013/0174371 A1 | 7/2013 | Jones |
| 2013/0198481 A1 | 8/2013 | Gander et al. |
| 2013/0200993 A1* | 8/2013 | Wu .............. G06F 3/0602 340/4.31 |
| 2013/0204463 A1 | 8/2013 | Chiappetta |
| 2013/0204465 A1 | 8/2013 | Phillips |
| 2013/0204483 A1 | 8/2013 | Sung |
| 2013/0205520 A1 | 8/2013 | Kapoor |
| 2013/0206170 A1 | 8/2013 | Svendsen |
| 2013/0206177 A1 | 8/2013 | Burlutskiy |
| 2013/0211589 A1 | 8/2013 | Landry |
| 2013/0214498 A1 | 8/2013 | DeFazio |
| 2013/0226344 A1 | 8/2013 | Wong |
| 2013/0227801 A1 | 9/2013 | Kim |
| 2013/0227812 A1 | 9/2013 | Kim |
| 2013/0228198 A1 | 9/2013 | Hung |
| 2013/0228199 A1 | 9/2013 | Hung |
| 2013/0231779 A1 | 9/2013 | Purkayastha |
| 2013/0231819 A1 | 9/2013 | Hung |
| 2013/0232702 A1 | 9/2013 | Baek |
| 2013/0239870 A1 | 9/2013 | Hudson |
| 2013/0241217 A1 | 9/2013 | Hickey |
| 2013/0253701 A1 | 9/2013 | Halloran |
| 2013/0256042 A1 | 10/2013 | Rudakevych |
| 2013/0268118 A1 | 10/2013 | Grinstead |
| 2013/0269148 A1 | 10/2013 | Chiu |
| 2013/0273252 A1 | 10/2013 | Miyamoto |
| 2013/0298350 A1 | 11/2013 | Schnittman |
| 2013/0310978 A1 | 11/2013 | Ozick |
| 2013/0325178 A1 | 12/2013 | Jones |
| 2013/0331987 A1 | 12/2013 | Karlsson |
| 2013/0331988 A1 | 12/2013 | Goel et al. |
| 2013/0338525 A1 | 12/2013 | Allen |
| 2013/0338828 A1 | 12/2013 | Chiappetta |
| 2013/0338831 A1 | 12/2013 | Noh |
| 2013/0340201 A1 | 12/2013 | Jang et al. |
| 2014/0016469 A1 | 1/2014 | Ho |
| 2014/0026339 A1 | 1/2014 | Konandreas |
| 2014/0053351 A1 | 2/2014 | Kapoor |
| 2014/0109339 A1 | 4/2014 | Won |
| 2014/0123325 A1 | 5/2014 | Jung |
| 2014/0130272 A1 | 5/2014 | Won |
| 2014/0142757 A1 | 5/2014 | Ziegler |
| 2014/0167931 A1 | 6/2014 | Lee |
| 2014/0180968 A1 | 6/2014 | Song |
| 2014/0266047 A1 | 6/2014 | Millen et al. |
| 2014/0207280 A1 | 7/2014 | Duffley |
| 2014/0207281 A1 | 7/2014 | Angle |
| 2014/0207282 A1 | 7/2014 | Angle |
| 2014/0238440 A1 | 8/2014 | Dayton |
| 2014/0249671 A1 | 9/2014 | Halloran |
| 2014/0283326 A1 | 9/2014 | Song |
| 2015/0005937 A1 | 1/2015 | Ponulak |
| 2015/0032259 A1* | 1/2015 | Kim .............. A47L 9/2805 700/255 |
| 2015/0039127 A1 | 2/2015 | Matsumoto |
| 2015/0057800 A1 | 2/2015 | Cohen |
| 2015/0120056 A1 | 4/2015 | Noh et al. |
| 2015/0185322 A1 | 7/2015 | Haegermarck |
| 2015/0197012 A1 | 7/2015 | Schnittman |
| 2015/0206015 A1 | 7/2015 | Ramalingam |
| 2015/0265122 A1 | 9/2015 | Han |
| 2016/0007817 A1 | 1/2016 | Schlischka |
| 2016/0008982 A1* | 1/2016 | Artes .............. G05D 1/0274 700/254 |
| 2016/0103451 A1 | 4/2016 | Vicenti |
| 2016/0144511 A1 | 5/2016 | Romanov et al. |
| 2016/0167226 A1 | 6/2016 | Schnittman |
| 2016/0202703 A1 | 7/2016 | Matsubara |
| 2016/0306359 A1 | 10/2016 | Lindhe |
| 2016/0316982 A1 | 11/2016 | Kim et al. |
| 2017/0273521 A1 | 9/2017 | Klintemyr et al. |
| 2017/0273524 A1 | 9/2017 | Klintemyr et al. |
| 2017/0296021 A1 | 10/2017 | Li et al. |
| 2017/0344019 A1 | 11/2017 | Haegermarck et al. |
| 2018/0088583 A1 | 3/2018 | Wang et al. |
| 2018/0103812 A1 | 4/2018 | Lee et al. |
| 2019/0086933 A1 | 3/2019 | Munich et al. |

FOREIGN PATENT DOCUMENTS

| | | |
|---|---|---|
| CN | 1668238 A | 9/2005 |
| CN | 101161174 A | 4/2008 |
| CN | 101297267 A | 10/2008 |
| CN | 102046059 A | 5/2011 |
| CN | 102083352 A | 6/2011 |
| CN | 102949144 A | 3/2013 |
| CN | 103027634 | 4/2013 |
| CN | 103054516 A | 4/2013 |
| CN | 103491838 A | 1/2014 |
| CN | 103565373 A | 2/2014 |
| CN | 103948354 A | 7/2014 |
| CN | 104302453 A | 1/2015 |
| CN | 105326442 A | 2/2016 |
| CN | 105982611 A | 10/2016 |
| DE | 3536907 | 4/1986 |
| DE | 9307500 | 7/1993 |
| DE | 4211789 | 10/1993 |
| DE | 4340367 | 6/1995 |
| DE | 4439427 A1 | 5/1996 |
| DE | 19849978 | 5/2000 |
| DE | 202008017137 U1 | 3/2009 |
| DE | 102010000174 | 7/2011 |
| DE | 102010000573 | 9/2011 |
| DE | 102010037672 | 3/2012 |
| EP | 0142594 | 5/1985 |
| EP | 0358628 | 3/1990 |
| EP | 0474542 | 3/1992 |
| EP | 0569984 | 11/1993 |
| EP | 606173 | 7/1994 |
| EP | 1099143 | 11/2003 |
| EP | 1360922 | 11/2003 |
| EP | 1360922 A2 | 11/2003 |
| EP | 1441271 | 7/2004 |
| EP | 1331537 | 8/2005 |
| EP | 2050380 | 4/2009 |
| EP | 1969438 | 9/2009 |
| EP | 1395888 | 5/2011 |
| EP | 2316322 | 5/2011 |
| EP | 2322071 A1 | 5/2011 |
| EP | 2296005 | 6/2011 |
| EP | 2251757 | 11/2011 |
| EP | 2417894 | 2/2012 |
| EP | 2438843 | 4/2012 |
| EP | 2466411 | 6/2012 |
| EP | 2466411 A2 | 6/2012 |
| EP | 2561787 | 2/2013 |
| EP | 2578125 | 4/2013 |
| EP | 2583609 | 4/2013 |
| EP | 2604163 | 6/2013 |
| EP | 2624177 A1 | 8/2013 |
| EP | 2447800 | 4/2014 |
| EP | 2741483 | 6/2014 |
| EP | 2772815 | 9/2014 |
| EP | 2884364 A1 | 6/2015 |
| EP | 2992803 A1 | 3/2016 |
| FR | 2999410 | 6/2014 |
| GB | 1447943 | 9/1976 |
| GB | 2355523 | 4/2001 |
| GB | 2382251 | 5/2003 |
| GB | 2494446 | 3/2013 |
| JP | 5540959 | 3/1980 |
| JP | 6286414 | 4/1987 |
| JP | 62109528 | 5/1987 |
| JP | 62120510 | 6/1987 |
| JP | 62152421 | 7/1987 |
| JP | 62152424 | 7/1987 |
| JP | 63181727 | 7/1988 |

(56) References Cited

FOREIGN PATENT DOCUMENTS

| | | |
|---|---|---|
| JP | 63241610 | 10/1988 |
| JP | 03162814 A | 7/1991 |
| JP | 03166074 | 7/1991 |
| JP | 04260905 | 9/1992 |
| JP | 0584200 | 4/1993 |
| JP | 0584210 | 4/1993 |
| JP | 05084200 | 4/1993 |
| JP | 05189041 | 7/1993 |
| JP | 05224745 | 9/1993 |
| JP | 05228090 | 9/1993 |
| JP | 064133 | 1/1994 |
| JP | 0683442 | 3/1994 |
| JP | 06125861 | 5/1994 |
| JP | 06144215 | 5/1994 |
| JP | 06179145 | 6/1994 |
| JP | 075922 | 1/1995 |
| JP | 0759695 | 3/1995 |
| JP | 0732752 B2 | 4/1995 |
| JP | 07129239 | 5/1995 |
| JP | 07281742 | 10/1995 |
| JP | 08089455 | 4/1996 |
| JP | 08326025 | 12/1996 |
| JP | 0944240 | 2/1997 |
| JP | 09150741 | 6/1997 |
| JP | 09185410 | 7/1997 |
| JP | 11267074 | 10/1999 |
| JP | 2001022443 | 1/2001 |
| JP | 2001187009 | 7/2001 |
| JP | 2002355204 | 12/2002 |
| JP | 2002366228 | 12/2002 |
| JP | 2003116758 A | 4/2003 |
| JP | 2003280740 | 10/2003 |
| JP | 2004096253 | 3/2004 |
| JP | 2004166968 | 6/2004 |
| JP | 2004198212 | 7/2004 |
| JP | 2004303134 | 10/2004 |
| JP | 200540597 | 2/2005 |
| JP | 2005141636 | 6/2005 |
| JP | 2005314116 A | 11/2005 |
| JP | 2006015113 A | 1/2006 |
| JP | 2006087507 | 4/2006 |
| JP | 2006231477 | 9/2006 |
| JP | 2006314669 | 11/2006 |
| JP | 2007014369 A | 1/2007 |
| JP | 2007070658 | 3/2007 |
| JP | 2007143645 | 6/2007 |
| JP | 2008132299 A | 6/2008 |
| JP | 2008290184 | 12/2008 |
| JP | 2008543394 A | 12/2008 |
| JP | 2009500741 A | 1/2009 |
| JP | 2009509220 | 3/2009 |
| JP | 2009193240 | 8/2009 |
| JP | 201079869 | 4/2010 |
| JP | 2010526594 | 8/2010 |
| JP | 2010534825 A | 11/2010 |
| JP | 2011045694 | 3/2011 |
| JP | 2011253361 | 12/2011 |
| JP | 2012216051 | 11/2012 |
| JP | 2013041506 A | 2/2013 |
| JP | 201389256 | 5/2013 |
| JP | 2013247986 A | 12/2013 |
| JP | 2014023930 A | 2/2014 |
| JP | 2015534048 A | 11/2015 |
| KR | 20040096253 | 11/2004 |
| KR | 20050003112 | 1/2005 |
| KR | 20070070658 | 7/2007 |
| KR | 20090028359 | 3/2009 |
| KR | 101231932 | 3/2013 |
| KR | 201501240011 A | 11/2015 |
| NL | 7408667 | 1/1975 |
| WO | 8804081 | 6/1988 |
| WO | 9303399 | 2/1993 |
| WO | 9638770 | 12/1996 |
| WO | 0036961 | 6/2000 |
| WO | 0036970 | 6/2000 |
| WO | 0038025 | 6/2000 |
| WO | 0182766 | 11/2001 |
| WO | 0182766 A2 | 11/2001 |
| WO | 03022120 | 3/2003 |
| WO | 03024292 | 3/2003 |
| WO | 03026474 A2 | 4/2003 |
| WO | 2004006034 | 1/2004 |
| WO | 2004006034 A2 | 1/2004 |
| WO | 2004082899 | 9/2004 |
| WO | 2007008148 | 1/2007 |
| WO | 2007028049 | 3/2007 |
| WO | 2007051972 | 5/2007 |
| WO | 2007065034 | 6/2007 |
| WO | 2008048260 | 4/2008 |
| WO | 2009132317 | 10/2009 |
| WO | 2011003667 A1 | 1/2011 |
| WO | 2012008702 A2 | 1/2012 |
| WO | 2013105431 | 7/2013 |
| WO | 2013157324 | 10/2013 |
| WO | 2014033055 | 3/2014 |
| WO | 2014151501 A1 | 9/2014 |
| WO | 2015016580 | 2/2015 |
| WO | 2016005011 A1 | 1/2016 |

OTHER PUBLICATIONS

Non Final Office Action for U.S. Appl. No. 15/321,333, dated Oct. 24, 2018, 10 pages.
Position_Definition of Position by Merriam-Webster.pdf (Position | Definition of Position by Merriam-Webster, Oct. 16, 2018, Merriam-Webster, https://www.merriam-webster.com/dictionary/position, pp. 1-15.
Gutman et al., AMOS: Comparison of Scan Matching Approaches for Self-Localization in Indoor Environments, 1996, IEEE, pp. 61-67.
Non Final Office Action for U.S. Appl. No. 15/504,071, dated Nov. 2, 2018, 17 pages.
Notification of Reasons for Refusal of Japanese Application No. 2016-568949, dated Oct. 1, 2018 with translation, 6 pages.
Non Final Office Action for U.S. Appl. No. 15/504,066, dated Nov. 5, 2018, 18 pages.
International Search Report and Written Opinion for International Application No. PCT/EP2017/056100, dated Dec. 18, 2017, 9 pages.
International Preliminary Report on Patentability for International Application No. PCT/EP2017/056100, dated Sep. 17, 2019, 6 pages.
International Search Report and Written Opinion for International Application No. PCT/EP2017/063468, dated Mar. 1, 2018, 10 pages.
Non Final Office Action for U.S. Appl. No. 15/534,237, dated Mar. 7, 2019, 11 pages.
"SM51 Series Opposed Mode Sensors, DC sensors with metal housings: SM51EB/RB, SM51EB6/RB6", Banner Engineering Corporation, pp. 1-24.
Andersson, et al., "ISR: An Intelligent Service Robot", Centre for Autonomous Systems, Royal Institute of Technology, S-100 44 Stockholm, Sweden, pp. 1-24.
Berlin, et al. "Development of a Multipurpose Mobile Robot for Concrete Surface Processing", A Status Report, Feb. 1992, Sweden, pp. 1-10.
Borenstein, et al. "Real-Time Obstacle Avoidance for Fast Mobile Robots", IEEE, Jan. 6, 1996, pp. 1-18.
Braunstingl, et al., "Fuzzy Logic Wall Following of a Mobile Robot Based on the Concept of General Perception", ICAR '95, 7th International Conference on Advanced Robotics, Sant Feliu De Guixols, Spain pp. 367-376., Sep. 1995, pp. 1-9.
Caselli, et al. "Mobile Robot Navigation in Enclosed Large-Scale Space", Italy and U.S.A., pp. 1-5.
Cassens, et al. "Finishing and Maintaining Wood Floors", Wood Finishing, North Central Regional Extension Publication #136, pp. 1-8.
Chinese Office Action for Chinese Application No. 201380075503.9, dated Nov. 8, 2017 with translation, 16 pages.

(56) References Cited

OTHER PUBLICATIONS

Chinese Office Action for Chinese Application No. 20130075510.9, dated Feb. 6, 2017 with translation, 14 pages.
Chinese Office Action for Chinese Application No. 201380075503.9, dated Feb. 13, 2017 with translation, 18 pages.
Chinese Office Action for Chinese Application No. 201380075510.9, dated Oct. 27, 2017 with translation, 13 pages.
Chung et al.,"Path Planning for a Mobile Robot With Grid Type World Model", Proceedings of the 1992 IEEE/RSJ International Conference on Intelligent Robots and Systems,Jul. 7-10, 1992, pp. 439-444.
Collins, et al. "Cerebellar Control of a Line Following Robot", Computer Science and Electrical Engineering Department, University of Queensland, St.Lucia, Queensland, 4072 A, pp. 1-6.
Doty, et al. "Sweep Strategies for a Sensory-Driven, Behavior-Based Vacuum Cleaning Agent", 1993, Machine Intelligence Laboratory—Gainesville Florida, AAAI 1993 Fall Symposium Series—Research Triangle Park—Raleigh, NC, Oct. 22-24, 1993, pp. 1-6.
European Communication Pursuant to Article 94(3) for European Application No. 14176479.0, dated Nov. 27, 2017, 6 pages.
Everett, Sensors for Mobile Robots Theory and Application, A.K. Peters, 1995, Chapters 1 and 3, 70 pages.
Everett, Sensors for Mobile Robots Theory and Application, A.K. Peters, Ltd., 1995, Chapters 15 and 16, 59 pages.
Everett, Sensors for Mobile Robots Theory and Application, A.K. Peters, Ltd., 1995, Chapters 6, 7 and 10, 79 pages.
Everett, Sensors for Mobile Robots Theory and Application, A.K. Peters, Ltd., 1995, Chapters, 4a nd 5, 68 pages.
Everett, et al. "Survey of Collision Avoidance and Ranging Sensors for Mobile Robots", Revision 1, Technical Report 1194, Dec. 1992, pp. 1-154.
Extended European Search Report for European Application No. 16176479.0, dated Nov. 11, 2016, 9 pages.
Final Office Action for U.S. Appl. No. 14/409,291, dated Jun. 6, 2017, 21 pages.
Final Office Action for U.S. Appl. No. 15/100,667, dated Apr. 21, 2017, 26 pages.
Final Office Action for U.S. Appl. No. 15/101,212, dated Oct. 11, 2017, 7 pages.
Gavrilut, et al., "Wall-Following Method for an Autonomous Mobile Robot using Two IR Sensors", 12th WSEAS International Conference on SYSTEMS, Heraklion, Greece, Jul. 22-24, 2008, ISBN: 978-960-6766-83-1, ISSN: 1790-2769, pp. 205-209.
Herbst, et al., "Micromouse Design Specifications", Jun. 2, 1998, pp. 1-22.
International Preliminary Report on Patentability for International Application No. PCT/EP2013/077377, dated Jun. 21, 2016, 12 pages.
International Preliminary Report on Patentability for International Application No. PCT/EP2013/077378, dated Jun. 21, 2016, 7 pages.
International Preliminary Report on Patentability for International Application No. PCT/EP2013/077384, dated Jun. 21, 2016, 6 pages.
International Preliminary Report on Patentability for International Application No. PCT/EP2013/077385, dated Jun. 21, 2016, 7 pages.
International Preliminary Report on Patentability for International Application No. PCT/EP2013/077386, dated Jun. 21, 2016, 6 pages.
International Preliminary Report on Patentability for International Application No. PCT/EP2013/077387, dated Jun. 21, 2016, 9 pages.
International Preliminary Report on Patentability for International Application No. PCT/EP2013/077657, dated Jun. 21, 2016, 7 pages.
International Preliminary Report on Patentability for International Application No. PCT/EP2013/077661, dated Jun. 21, 2016, 11 pages.
International Preliminary Report on Patentability for International Application No. PCT/EP203/077380, dated Jun. 21, 2016, 6 pages.
International Search Report and Written Opinion of the International Searching Authoirty for International Application No. PCT/EP2015/040140, dated May 27, 2016, 11 pages.
International Search Report and Written Opinion of the International Searching Authority for Internatonal Applicaion No. PCT/EP2014/0077142, dated Sep. 11, 2015, 8 pages.
International Search Report and Written Opinion of the International Searching Authority for *International Application No. PCT/EP2015/058377, dated Aug. 10, 2016, 15 pages.
International Search Report and Written Opinion of the International Searching Authority for International Application No. PCT/EP2014/069073, dated May 12, 2015, 10pages.
International Search Report and Written Opinion of the International Searching Authority for International Application No. PCT/Ep2012/077377, dated Nov. 6, 2014, 18 pages.
International Search Report and Written Opinion of the International Searching Authority for International Application No. PCT/EP2013/077378, dated Apr. 9, 2014, 9 pages.
International Search Report and Written Opinion of the International Searching Authority for International Application No. PCT/EP2013/077380, dated Jul. 28, 2014, 8 pages.
International Search Report and Written Opinion of the International Searching Authority for International Application No. PCT/EP2013/077384, dated Aug. 14, 2016, 9 pages.
International Search Report and Written Opinion of the International Searching Authority for International Application No. PCT/EP2013/077385, dated May 27, 2015, 9 pages.
International Search Report and Written Opinion of the International Searching Authority for International Application No. PCT/EP2013/077386, dated Sep. 17, 2014, 9 pages.
International Search Report and Written Opinion of the International Searching Authority for International Application No. PCT/EP2013/077387, dated Sep. 30, 2014, 12 pages.
International Search Report and Written Opinion of the International Searching Authority for International Application No. PCT/EP2013/077661, dated Jun. 10, 2014, 15 pages.
International Search Report and Written Opinion of the International Searching Authority for International Application No. PCT/EP2014/069074, dated May 11, 2015, 9 pages.
International Search Report and Written Opinion of the International Searching Authority for International Application No. PCT/EP2014/077549, dated Jul. 27, 2015, 9 pages.
International Search Report and Written Opinion of the International Searching Authority for International Application No. PCT/EP2014/077947, dated Jul. 11, 2016, 14 pages.
International Search Report and Written Opinion of the International Searching Authority for International Application No. PCT/EP2014/077954, dated Oct. 12, 2015, 19pages.
International Search Report and Written Opinion of the International Searching Authority for International Application No. PCT/EP2014/078144, 7 pages.
International Search Report and Written Opinion of the International Searching Authority for International Application No. PCT/EP32013/077657, dated Aug. 18, 2014, 10 pages.
International Search Report for International Application No. PCT/EP2013/057814 dated Dec. 20, 2013, 5pages.
International Search Report for International Application No. PCT/EP2013/057815 mailed Apr. 12, 2014, 4 pages.
International Search Report for International Application No. PCT/EP2013/067500 dated Dec. 10, 2013, 4 pages.
Japanese Office Action for Application for Japanese Application No. 2015-528969, dated Apr. 7, 2017 with translation, 4 pages.
Japanese Office Action for Japanese Application No. 2016-506794, dated Feb. 7, 2017 with translation, 10 pages.
Japanese Office Action for Japanese Application No. 2016-506795 , dated Feb. 7, 2017 with translation, 6 pages.
Jenkins, "Practical Requirements for a Domestic Vacuum-Cleaning Robot", From: AAAI Technical Report FS-93-03., JRL Consulting, Menlo Park, California, pp. 85-90.
Jones et al., Mobile Robots Inspiration to Implementation, Second Edition, A.K. Peters, Ltd., 1999, Chapters 1 and 5, 72pages.
Jones etal., Mobile Robots Inspiration to Implementation, Second Edition, A.K. Peters ,Ltd., 1999, Chapters 6 and 9, 56pages.
Jones etal., Mobile Robots Inspiration to Implementation, Second Edition, A.K. Peters, Ltd., 1999, Chapters 10 and 11, 45pages.

(56) References Cited

OTHER PUBLICATIONS

Jung, et al. "Whisker Based Mobile Robot Navigation", Wollongong, NSW 2500, Australia, pp. 1-8.
Krishna, et al., "Solving the Local Minima Problem for a Mobile Robot by Classification of Spatio-Temporal Sensory Sequences", Journal of Robotic Systems 17 (10), 2000, pp. 549-564.
Kube, "A Minimal Infrared Obstacle Detection Scheme", Department of Computing Science, University of Alberta, Edmonton, Alberta, Canada, The Robotics Practitioner, 2(2): 15-20, 1996, Oct. 23, 1998, pp. 1-8.
Larson, "RoboKent—a case study in man-machine interfaces" Industrial Robot, vol. 25 No. 2, 1998, pp. 95-100.
LeBouthillier, "W. Grey Walter and his Turtle Robots", The Robot Builder, vol. Eleven No. Five, May 1999, RSSC POB 26044, Santa Ana,CA, pp. 1-8.
Maaref, et al."Sensor-based navigation of a mobile robot in an indoor environment", Robotics and Autonomous Systems, 2002, Elsevier, 18pages.
Michael Carsten Bosse, "Atlas: A Framework for Large Scale Automated Mapping and Localization", Massachusetts Institute of Technology, Feb. 2004, Part 2, 67 pages.
Michael Carsten Bosse, "Atlas: A Framework for Large Scale Automated Mapping and Localization", Massachusetts Institute of Technology, Feb. 2004, Part 1, 140 pages.
Non Final Office Action for U.S. Appl. No. 14/409,291, dated Dec. 28, 2016, 61 pages.
Non Final Office Action for U.S. Appl. No. 14/784,106, dated Oct. 19, 2017, 11 pages.
Non Final Office Action for U.S. Appl. No. 15/101,235, dated Nov. 1, 2017, 11 pages.
Non Final Office Action for U.S. Appl. No. 15/100,667, dated Nov. 29, 2017, 22 pages.
Non Final Office Action for U.S. Appl. No. 15/100,667, dated Sep. 12, 2016, 24 pages.
Non Final Office Action for U.S. Appl. No. 15/101,212, dated May 17, 2017, 8 pages.
Non Final Office Action for U.S. Appl. No. 15/101,235 dated Apr. 21, 2017, 10 pages.
Non Final Office Action for U.S. Appl. No. 15/101,257, dated Feb. 10, 2017, 10 pages.
Non Final Office Action for U.S. Appl. No. 15/102,015, dated Aug. 17, 2017, 13 pages.
Notice of Allowance for U.S. Appl. No. 14/409,291, dated Jun. 16, 2016, 13 pages.
Notice of Allowance for U.S. Appl. No. 14/409,291, dated Sep. 18, 2017, 8 pages.
Notice of Allowance for U.S. Appl. No. 15/101,257, dated Jul. 6, 2017, 9 pages.
Notice of Allowance for U.S. Appl. No. 15/102,015, dated Dec. 11, 2017, 8 pages.
Notice of Reasons for Rejection for Japanese Application No. 2016-526759, dated Aug. 24, 2017 with translation, 9 pages.
Notice of Reasons for Rejection for Japanese Application No. 2016-526765, dated Aug. 25, 2017 with translation, 7 pages.
Notice of Reasons for Rejection for Japanese Application No. 2016-526756, dated Aug. 10, 2017, with translation, 6 pages.
Notice of Reasons for Rejection of Japanese Application No. 2016-526764, dated Aug. 25, 2017 with translation., 6 pages.
Notification fo Reasons for Refusal for Japanese Application No. 2016-526875, dated Oct. 31, 2017 with translation, 10 pages.
Notification of Reasons for Refusal for Japanese Application No. 2016-526945, dated Oct. 31, 2017 with translation, 8 pages.
Notification of Reasons for Rejection for Japanese Application No. 2016-526947, dated Sep. 21, 2017 with translation,, 8 pages.
Oren, Reply to Office Action dated Jun. 23, 2014, U.S. Appl. No. 13/757,985, pp. 1-10.
Pack, et al., "Constructing a Wall-Follower Robot for a Senior Design Project", 1996 ASEE Annual Conference Proceedings, Session 1532, pp. 1-7.
Saffiotti, "Fuzzy logic in Autonomous Robot Navigation", a case study, Nov. 1995 Revised: Aug. 1997, IRIDIA, Universite Libre de Bruxelles, Belgium, , Technical Report TR/IRIDIA/ 95 25, Cover page + pp. 1-14.
Written Opinion for International Application No. PCT/EP2013/067500 dated Dec. 10, 2013, 7 pages.
Yamamoto, "SOZZY: A Hormone-Driven Autonomous Vacuum Cleaner", From: AAAI Technical Report FS-93-03, Matasushita Research Institute, Tokyo, and MIT Artificial Intelligence laboratory, Massachusetts, pp. 116-124 + Figure 9 and Figure 11.
Non Final Office Action for U.S. Appl. No. 15/101,515, dated Apr. 18, 2018, 14 pages.
Notice of Allowance for U.S. Appl. No. 15/101,212, dated Apr. 11, 2018, 9 pages.
Final Office Action for U.S. Appl. No. 14/784,106, dated Mar. 28, 2018, 8 pages.
Final Office Action for U.S. Appl. No. 15/100,667, dated Mar. 27, 2018, 22 pages.
Notification of Reasons for Refusal for Japanese Application No. 2017-501374, dated Mar. 6, 2018 with translation, 8 pages.
Chinese Office Action for Chinese Application No. 201380081535.X, dated Mar. 26, 2018 with translation, 18 pages.
Chinese Office Action for Chinese Application No. 201380081103.9, dated Feb. 27, 2018 with translation, 19 pages.
International Search Report and Written Opinion for International Application No. PCT/EP2016/055547, dated Jan. 2, 2017, 10 pages.
Notice of Allowance for U.S. Appl. No. 15/100,667, dated Aug. 6, 2018, 10 pages.
Non Final Office Action for U.S. Appl. No. 15/101,510, dated Jul. 27, 2018, 17 pages.
Non Final Office Action for U.S. Appl. No. 14/784,110, dated Aug. 16, 2018, 13 pages.
Chinese Office Action for Chinese Application No. 201380081537.9, dated Jun. 4, 2018 with translation, 15 pages.
International Search Report and Written Opinion for International Application No. PCT/EP2015/070140, dated May 27, 2016, 11 pages.
European Communication Pursuant to Article 94(3) for European Application No. 13817911.4, dated Jan. 15, 2018, 8 pages.
Non Final Office Action for U.S. Appl. No. 15/102,017, dated Feb. 16, 2018, 12 pages.
Extended European Search Report for European Application No. 18157403.9, dated Nov. 14, 2018, 12 pages.
Report of Reconsideration by Examiner before Appeal for Japanese Application No. 2016-526875, dated Oct. 24, 2018, 2 pages.
Final Office Action for U.S. Appl. No. 15/101,235, dated Jan. 11, 2019, 12 pages.
International Search Report and Written Opinion of the International Searching Authority for International Application No. PCT/E2016/072291, dated Jun. 6, 2017, 11 pages.
Non Final Office Action for U.S. Appl. No. 15/102,017, dated Jan. 22, 2019, 15 pages.
Final Office Action for U.S. Appl. No. 15/101,510, dated Feb. 8, 2019, 16 pages.
Notice of Allowance for U.S. Appl. No. 15/102,295, dated Sep. 24, 2018, 9 pages.
Notice of Allowance for U.S. Appl. No. 15/101,515, dated Aug. 28, 2018, 11 pages.
International Search Report and Written Opinion of the International Searching Authority for International Application No. PCT/EP2016/060565, dated Feb. 15, 2017, 12 pages.
International Search Report and Written Opinion of the International Searching Authority for International Application No. PCT/EP2016/060571, dated Feb. 7, 2017, 8 pages.
Chinese Office Action for Chinese Application No. 2014800837122, dated May 5, 2019 with translation, 20 pages.
Chinese Office Action for Chinese Application No. 2015800781846, dated Sep. 18, 2019 with translation, 15 pages.
Notification of Reasons for Refusal for Japanese Application No. 2017-544589, dated Apr. 2, 2019 with translation, 6 pages.
Final Office Action for U.S. Appl. No. 15/102,017, dated Jun. 14, 2018, 12 pages.

(56) References Cited

OTHER PUBLICATIONS

Non Final Office Action for U.S. Appl. No. 15/101,235, dated Jun. 14, 2018, 11 pages.
Chinese Office Action for Chinese Application No. 201380081331.6, dated Mar. 26, 2018 with translation, 27 pages.
Decision of Refusal for Japanese Application No. 2016-526945, dated May 15, 2018 with translation, 5 pages.
Decision of Refusal for Japanese Application No. 2016-526875, dated May 15, 2018 with translation, 6 pages.
Notification of Reasons for Refusal for Japanese Application No. 2016-526765, dated May 15, 2018 with translation, 6 pages.
Final Office Action for U.S. Appl. No. 15/534,327, dated Jul. 26, 2019, 16 pages.
Chinese Office Action for Chinese Application No. 2015800781846, dated Mar. 24, 2020, 9 pages.
Chinese Office Action for Chinese Application No. 2014800837122, dated Jan. 7, 2020, 10 pages.
Notice of Reasons for Refusal for Japanese Application No. 2018-537617, dated Feb. 28, 2020, 3 pages.
Chinese Office Action issued in Chinese Application No. 2014800837122, dated Jul. 17, 2020 with translation, 18 pages.
Chinese Office Action issued in Chinese Application No. 2016800855242, dated Jul. 3, 2020, 15 pages.
USPTO Notice of Allowance issued in U.S. Appl. No. 15/534,327, dated Aug. 13, 2020, 5 pages.
USPTO Non Final Office Action issued in U.S. Appl. No. 16/083,161, dated Oct. 27, 2020, 13 pages.
Chinese Office Action issued in Chinese Patent Application No. 2017800875876, dated Jan. 6, 2021, 12 pages.
Chinese Office Action issued in Chinese Application No. 201780090566X, dated Feb. 1, 2021, 11 pages.

\* cited by examiner

ROBOTIC CLEANING DEVICE AND A METHOD OF CONTROLLING THE ROBOTIC CLEANING DEVICE

This application is a U.S. National Phase application of PCT International Application No. PCT/EP2015/058377, filed Apr. 17, 2015, which is incorporated by reference herein.

TECHNICAL FIELD

The invention relates to a robotic cleaning device and a method of controlling the robotic cleaning device.

BACKGROUND

In many fields of technology, it is desirable to use robots with an autonomous behaviour such that they freely can move around a space without colliding with possible obstacles.

Robotic vacuum cleaners are know in the art, which are equipped with drive means in the form of a motor for moving the cleaner across a surface to be cleaned. The robotic vacuum cleaners are further equipped with intelligence in the form of microprocessor(s) and navigation means for enabling an autonomous behaviour such that the robotic vacuum cleaners freely can move around and clean a space in the form of e.g. a room. Thus, these prior art robotic vacuum cleaners has the capability of more or less autonomously vacuum cleaning a room in which furniture such as tables and chairs and other obstacles such as walls and stairs are located.

Modern robotic vacuum cleaners are arranged with a user interface (UI) via which a user of the robotic cleaner may input instructions, such as selecting and scheduling a cleaning program to be performed or for entering data such as time and date. A problem with these ULs is that the types of input data which can be entered are rather limited. Further, the size of the UI to be operated by a user is small, making it cumbersome for a user to input data via the UI. Moreover, as with many electronic devices, the data to be entered may be perceived as non-intuitive for a user.

SUMMARY

An object of the present invention is to solve, or at least mitigate, one or more of these problems in the art and to provide an improved method and robotic cleaning device for facilitating, for a user, to provide the robotic cleaning device with user instructions.

This object is attained in a first aspect of the invention by a method of controlling operation of a robotic cleaning device. The method comprises sensing a displacement of the robotic cleaning device, determining a characteristic of the displacement of the robotic cleaning device, and setting the to robotic cleaning device in an operational mode being associated with the determined characteristic of the displacement.

This object is attained in a second aspect of the invention by a robotic cleaning device comprising an inertia measurement unit and a controller. The inertia measurement unit is arranged to sense a displacement of the robotic cleaning device and the controller is arranged to determine a characteristic of the displacement of the robotic cleaning device, and to set the robotic cleaning device in an operational mode being associated with the determined characteristic of the displacement.

Advantageously, by sensing at the robotic cleaning device a displacement of the device caused by a user, for instance by means of sensing the displacement with an inertial measurement unit (IMU), the robotic device is capable of determining a characteristic of the sensed displacement, such as a change in orientation or rotational velocity.

Based on the determined characteristic, the robotic cleaning device is set in a particular operational mode (possibly one out of a plurality of operational modes). For instance, if the user would lift the robotic device up from the floor and shake it back and forth, the robotic device could be configured to be set in an operational mode defined as "reset" in terms of setup preferences, or in case the robotic device is in the process of carrying through a cleaning program, the same operation of lifting the robotic device up from the floor and shake it back and forth could be configured to imply "start over". The act of lifting the robotic device from the floor up to a certain height above the floor may in itself indicate that the displacement is caused by a user and not the result of a normal displacement.

Thus, it is advantageously facilitated for a user to provide the robotic device with instructions without having to operate the UI of the robotic device. Further advantageous is that this may be provided with already available hardware means in the form of the IMU, as robotic cleaning devices typically are arranged with one or more IMUs.

In an embodiment of the invention, the selected operational mode is further based on a current operational mode of the robotic cleaning device; if the current operational mode e.g. is "located in charging station", the shaking could advantageously imply "reset", while if the current operational mode for instance is "running cleaning program A", the same shaking motion of the user could advantageously imply "start over".

In a further embodiment of the invention, the setting of the robotic cleaning device in an operational mode being associated with the determined characteristic of the displacement advantageously comprises enabling wireless setup of the robotic cleaning device to a Wireless Local Area Network (WLAN) when displaced to a predetermined orientation. In this particular exemplifying embodiment, the user may pick the robotic device up from the floor and for instance turn it upside down The IMU of the robotic device will sense this displacement, and the controller registers the displacement caused by the user and sensed by the IMU. The controller will in this embodiment determine the characteristic of displacement simply by concluding from IMU data that the robotic device is upside down and set the robot in a wireless setup mode.

In the wireless setup mode, the robotic device will advantageously communicate wirelessly, for example via Bluetooth, with a mobile terminal of the user. The mobile terminal will then via a particular app transfer the name of a WLAN of the user and the required password, such that the robotic device subsequently can connect to the WLAN provided by an Access Point (AP) such as e.g. a home router for wireless WiFi communication.

In yet a further embodiment of the present invention, in order to avoid a situation where the user would set the robotic cleaning device in an operational mode with a displacement that could occur when the robotic device moves about to during normal operation, and thus accidentally have the robot itself enter the operational mode during performance of a normal cleaning program, the operational mode to be set is configured to be associated with a characteristic of displacement which deviates from a characteristic corresponding to a displacement occurring during normal operation of the robotic cleaning device.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The invention relates to robotic cleaning devices, or in other words, to automatic, self-propelled machines for cleaning a surface, e.g. a robotic vacuum cleaner, a robotic sweeper or a robotic floor washer. The robotic cleaning device according to the invention can be mains-operated and have a cord, be battery-operated or use any other kind of suitable energy source, for example solar energy.

Figure 1:
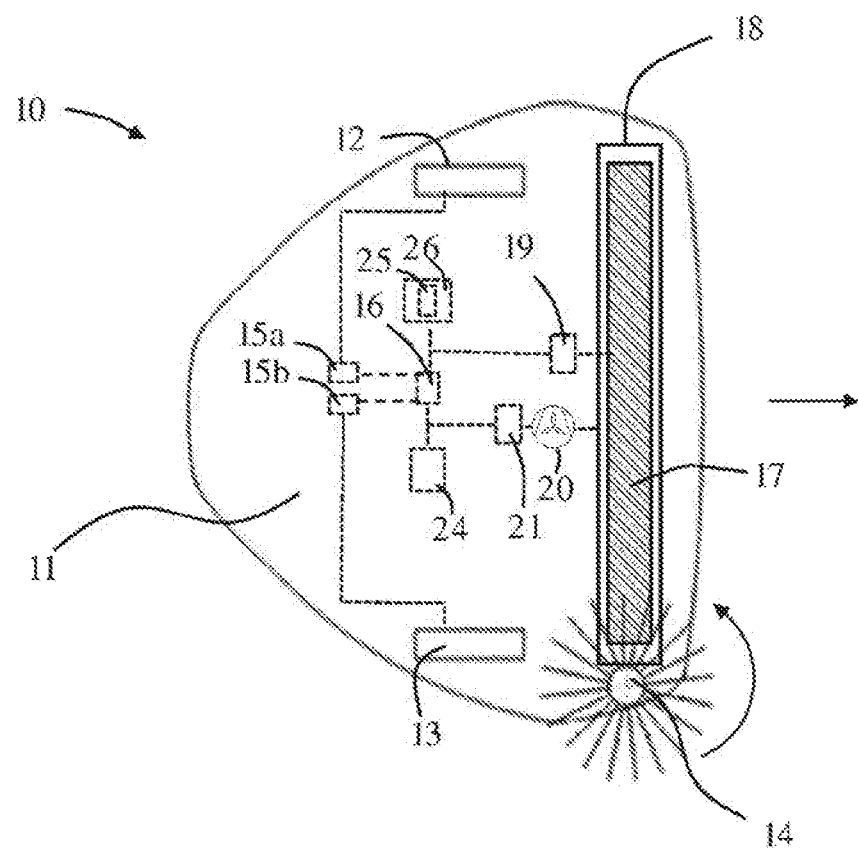
FIG. 1 shows a bottom view of a robotic cleaning device according to embodiments of the present invention.

FIG. 1 shows a robotic cleaning device 10 according to embodiments of the present invention in a bottom view, i.e. the bottom side of the robotic cleaning device is shown. The arrow indicates the forward direction of the robotic cleaning device. The robotic cleaning device 10 comprises a main body 11 housing components such as a propulsion system comprising driving means in the form of two electric wheel motors 15a, 15b for enabling movement of the driving wheels 12, 13 such that the cleaning device can be moved over a surface to be cleaned. Each wheel motor 15a, 15b is capable of controlling the respective driving wheel 12, 13 to rotate independently of each other in order to move the robotic cleaning device 10 across the surface to be cleaned.

A number of different driving wheel arrangements, as well as various wheel motor arrangements, can be envisaged. It should be noted that the robotic cleaning device may have any appropriate shape, such as a device having a more traditional circular-shaped main body, or a triangular-shaped main body. As an alternative, a track propulsion system may be used or even a hovercraft propulsion system. The propulsion system may further be arranged to cause the robotic cleaning device 10 to perform any one or more of a yaw, pitch, translation or roll movement.

A controller 16 such as a microprocessor controls the wheel motors 15a, 15b to rotate the driving wheels 12, 13 as required in view of information received from an obstacle detecting device (not shown in FIG. 1) for detecting obstacles in the form of walls, floor lamps, table legs, around which the robotic cleaning device must navigate. The obstacle detecting device may be embodied in the form of a 3D sensor system registering its surroundings, implemented by means of e.g. a 3D camera, a camera in combination with lasers, a laser scanner, etc. for detecting obstacles and communicating information about any detected obstacle to the microprocessor 16. The microprocessor 16 communicates with the wheel motors 15a, 15b to control movement of the wheels 12, 13 in accordance with information provided by the obstacle detecting device such that the robotic cleaning device 10 can move as desired across the surface to be cleaned. This will be described in more detail with reference to subsequent drawings.

Further, the main body 11 may optionally be arranged with a cleaning member 17 for removing debris and dust from the surface to be cleaned in the form of a rotatable brush roll arranged in an opening 18 at the bottom of the robotic cleaner 10. Thus, the rotatable brush roll 17 is arranged along a horizontal axis in the opening 18 to enhance the dust and debris collecting properties of the cleaning device 10. In order to rotate the brush roll 17, a brush roll motor 19 is to operatively coupled to the brush roll to control its rotation in line with instructions received from the controller 16.

Moreover, the main body 11 of the robotic cleaner 10 comprises a suction fan 20 creating an air flow for transporting debris to a dust bag or cyclone arrangement (not shown) housed in the main body via the opening 18 in the bottom side of the main body 11. The suction fan 20 is driven by a fan motor 21 communicatively connected to the controller 16 from which the fan motor 21 receives instructions for controlling the suction fan 20. It should be noted that a robotic cleaning device having either one of the rotatable brush roll 17 and the suction fan 20 for transporting debris to the dust bag can be envisaged. A combination of the two will however enhance the debris-removing capabilities of the robotic cleaning device 10.

The main body 11 or the robotic cleaning device 10 is further equipped with an inertia measurement unit (IMU) 24, such as e.g. a gyroscope and/or an accelerometer and/or a magnetometer or any other appropriate device for measuring displacement of the robotic cleaning device 10 with respect to a reference position, in the form of e.g. orientation, rotational velocity, gravitational forces, etc. A three-axis gyroscope is capable of measuring rotational velocity in a roll, pitch and yaw movement of the robotic cleaning device 10. A three-axis accelerometer is capable of measuring acceleration in all directions, which is mainly used to determine whether the robotic cleaning device is bumped or lifted or if it is stuck (i.e. not moving even though the wheels are turning). The robotic cleaning device 10 further comprises encoders (not shown in FIG. 1) on each drive wheel 12, 13 which generate pulses when the wheels turn. The encoders may for instance be magnetic or optical. By counting the pulses at the controller 16, the speed of each wheel 12, 13 can be determined. By combining wheel speed readings with gyroscope information, the controller 16 can perform so called dead reckoning to determine position and heading of the cleaning device 10.

The main body 11 may further be arranged with a rotating side brush 14 adjacent to the opening 18, the rotation of which could be controlled by the drive motors 15a, 15b, the brush roll motor 19, or alternatively a separate side brush motor (not shown). Advantageously, the rotating side brush 14 sweeps debris and dust such from the surface to be cleaned such that the debris ends up under the main body 11 at the opening 18 and thus can be transported to a dust chamber of the robotic cleaning device. Further advantageous is that the reach of the robotic cleaning device 10 will be improved, and e.g. corners and areas where a floor meets a wall are much more effectively cleaned. As is illustrated in FIG. 1, the rotating side brush 14 rotates in a direction such that it sweeps debris towards the opening 18 such that the suction fan 20 can transport the debris to a dust chamber. The robotic cleaning device 10 may comprise two rotating side brushes arranged laterally on each side of, and adjacent to, the opening 18.

With further reference to FIG. 1, the controller/processing unit 16 embodied in the form of one or more microprocessors is arranged to execute a computer program 25 downloaded to a suitable storage medium 26 associated with the microprocessor, such as a Random Access Memory (RAM), a Flash memory or a hard disk drive. The controller 16 is arranged to carry out a method according to embodiments of the present invention when the appropriate computer program comprising computer-executable instructions is downloaded to the storage medium 26 and executed by the controller 16. The storage medium 26 may also be a computer program product comprising the computer program 25. Alternatively, the computer program 25 may be transferred to the storage medium 26 by means of a suitable computer program product, such as a digital versatile disc (DVD), compact disc (CD) or a memory stick. As a further alternative, the computer program 25 may be downloaded to the storage medium 26 over a wired or wireless network. The controller 16 may alternatively be embodied in the form of a digital signal processor (DSP), an application specific integrated circuit (ASIC), a field-programmable gate array (FPGA), a complex programmable logic device (CPLD), etc.

Figure 2:
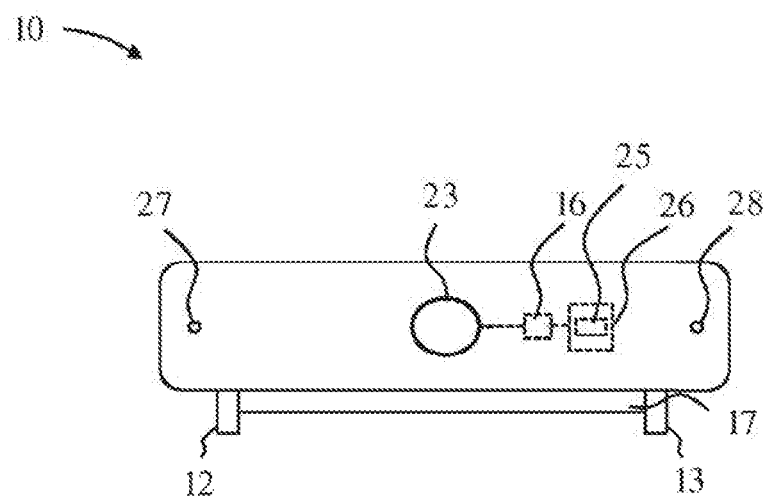
FIG. 2 shows a front view of a robotic cleaning device according to embodiments of the present invention.

FIG. 2 shows a front view of the robotic cleaning device 10 of FIG. 1 in an embodiment of the present invention illustrating the previously mentioned obstacle detecting device in the form of a 3D sensor system comprising at least a camera 23 and a first and a second line laser 27, 28, which may be horizontally or vertically oriented line lasers. Further shown is the controller 16, the main body 11, the driving wheels 12, 13, and the rotatable brush roll 17 previously discussed with reference to FIG. 1a. The controller 16 is operatively coupled to the camera 23 for recording images of a vicinity of the robotic cleaning device 10. The first and second line lasers 27, 28 may preferably be vertical line lasers and are arranged lateral of the camera 23 and configured to illuminate a height and a width that is greater than the height and width of the robotic cleaning device 10. Further, the angle of the field of view of the camera 23 is preferably smaller than the space illuminated by the first and second line lasers 27, 28. The camera 23 is controlled by the controller 16 to capture and record a plurality of images per second. Data from the images is extracted by the controller 16 and the data is typically saved in the memory 26 along with the computer program 25.

The first and second line lasers 27, 28 are typically arranged on a respective side of the camera 23 along an axis being perpendicular to an optical axis of the camera. Further, the line lasers 27, 28 are directed such that their respective laser beams intersect within the field of view of the camera 23. Typically, the intersection coincides with the optical axis of the camera 23.

The first and second line laser 27, 28 are configured to scan, preferably in a vertical orientation, the vicinity of the robotic cleaning device 10, normally in the direction of movement of the robotic cleaning device 10. The first and second line lasers 27, 28 are configured to send out laser beams, which illuminate furniture, walls and other objects of e.g. a room to be cleaned. The camera 23 is controlled by the controller 16 to capture and record images from which the controller 16 creates a representation or layout of the surroundings that the robotic cleaning device 10 is operating in, by extracting features from the images and by measuring the distance covered by the robotic cleaning device 10, while the robotic cleaning device 10 is moving across the surface to be cleaned. Thus, the controller 16 derives positional data of the robotic cleaning device 10 with respect to the surface to be cleaned from the recorded images, generates a 3D representation of the surroundings from the derived positional data and controls the driving motors 15a, 15b to move the robotic cleaning device across the surface to be cleaned in accordance with the generated 3D representation and navigation information supplied to the robotic cleaning device 10 such that the surface to be cleaned can be navigated by taking into account the generated 3D representation. Since the derived positional data will serve as a foundation for the navigation of the robotic cleaning device, it is important that the positioning is correct; the robotic device will otherwise navigate according to a "map" of its surroundings that is misleading.

The 3D representation generated from the images recorded by the 3D sensor system thus facilitates detection of obstacles in the form of walls, floor lamps, table legs, around which the robotic cleaning device must navigate as well as rugs, carpets, doorsteps, etc., that the robotic cleaning device 10 must traverse. The robotic cleaning device 10 is hence configured to learn about its environment or surroundings by operating/cleaning.

Hence, the 3D sensor system comprising the camera 23 and the first and second vertical line lasers 27, 28 is arranged to record images of a vicinity of the robotic cleaning from which objects/obstacles may be detected. The controller 16 is capable of positioning the robotic cleaning device 10 with respect to the detected obstacles and hence a surface to be cleaned by deriving positional data from the recorded images. From the positioning, the controller 16 controls movement of the robotic cleaning device 10 by means of controlling the wheels 12, 13 via the to wheel drive motors 15a, 15b, across the surface to be cleaned.

The derived positional data facilitates control of the movement of the robotic cleaning device 10 such that cleaning device can be navigated to move very close to an object, and to move closely around the object to remove debris from the surface on which the object is located. Hence, the derived positional data is utilized to move flush against the object, being e.g. a thick rug or a wall. Typically, the controller 16 continuously generates and transfers control signals to the drive wheels 12, 13 via the drive motors 15a, 15b such that the robotic cleaning device 10 is navigated close to the object.

Figure 3A:
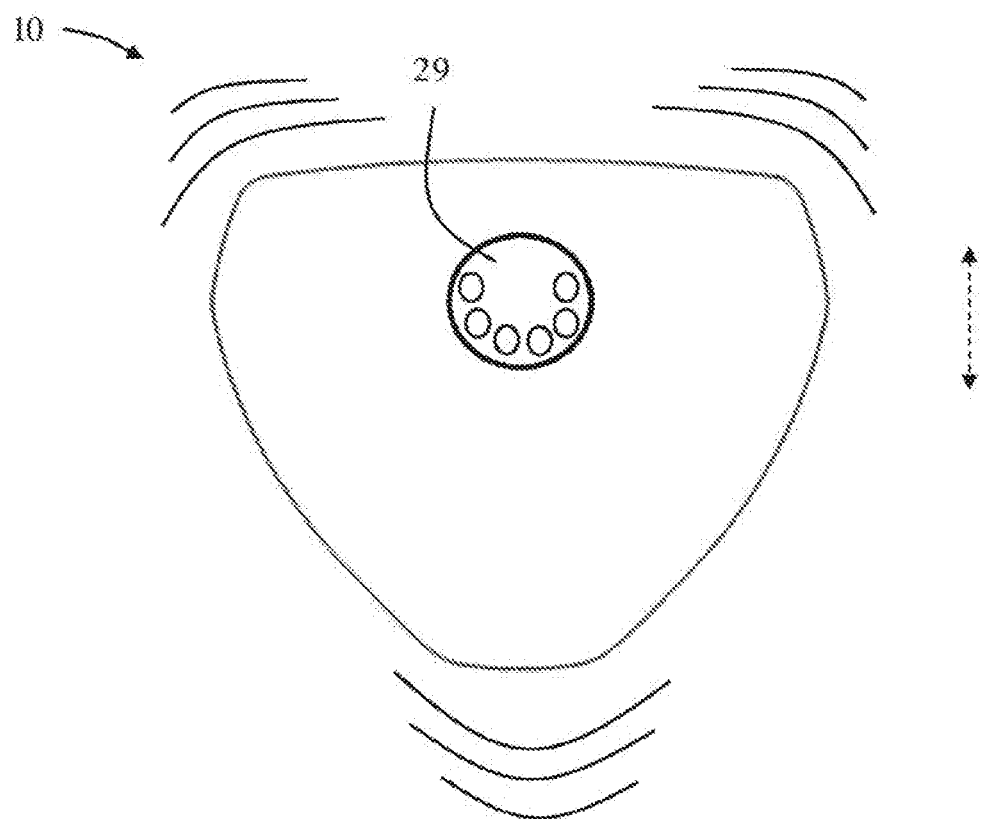
FIG. 3a shows a top view of a robotic cleaning device being displaced according to an embodiment of the present invention.

With reference to FIG. 3a, where the robotic device 10 is illustrated in a top view, assuming that a user would want to provide the robotic vacuum cleaner 10 with a particular type of instruction without operating a user interface 29, in this particular exemplifying embodiment an instruction specifying that the robotic cleaning device 10 is to be "reset" or "start over" as will be discussed in more detail in the following. This instruction is communicated to the robotic device 10 by having the user picking the robot 10 up from the floor and shaking it back and forth as illustrated in FIG. 3a.

The UI 29 may be of touch-screen type or mechanically configured comprising physical buttons to be operated. Further, the user interface 29 may comprise display means for visually indicating a user selection. It should be noted that the user not necessarily need to provide input to the UI 29 by physically touching the UI, but may alternatively communicate with the UI 29 via a remote control.

Figure 3B:
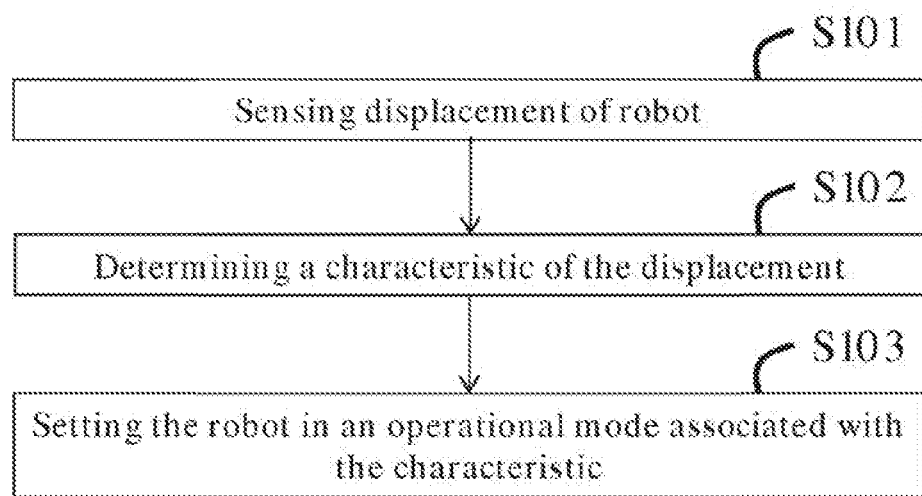
FIG. 3b illustrates a flow chart of an embodiment of a method of controlling a robotic cleaning device according to the present invention.

The user behaviour described with reference to FIG. 3a causes the robotic device to perform a method according to an embodiment of the invention for controlling the robotic cleaning device 10, FIG. 3b illustrates a flowchart of this embodiment of the method. Reference is further made to FIG. 1 for structural elements.

Thus, the user picks the robot 10 up from the floor and shakes it back and forth. The IMU 24 of the robotic device 10 will sense this displacement in step S101, and the controller 16 will accordingly register the sensed displacement brought about by the user. Now, upon registering the displacement sensed by the IMU 24, the controller 16 will determine a characteristic of the displacement in step S102, in this particular example being that the robotic device is shaken back and forth, i.e. brought from a first position in a particular direction to a second position and subsequently being brought back to the first position from the second position in a substantially reverse direction. This characteristic may be determined by the controller 16 for instance by having the IMU 24 measure a change in orientation and possibly velocity of the robotic device 10 as it is shaken by the user.

Thereafter, in step S103, the controller 16 sets the robotic cleaning device in an operational mode associated with the determined characteristic.

Now, in this particular example, if the robotic device 10 is temporarily inactive, for instance being charged in its charging station, this particular instruction provided by the user may imply that the robotic cleaning device 10 is reset in terms of registered upcoming cleaning programs. These are generally stored in the memory 25, and the controller 16 may thus erase such registered upcoming cleaning programs in favour of a "reset" default setup.

However, in case the robotic device 10 is in the process of performing a cleaning program, the operation of picking the robotic device up from the floor and shake it back and forth could be configured to imply that the current cleaning program should start over.

Hence, in an embodiment of the invention, the selected operational mode is further based on a current operational mode of the robotic cleaning device 10; if the current operational mode e.g. is "located in charging station", the shaking could imply "reset", while if the current operational mode for instance is "running cleaning program A", the same shaking motion of the user could imply "start over".

Figure 4:
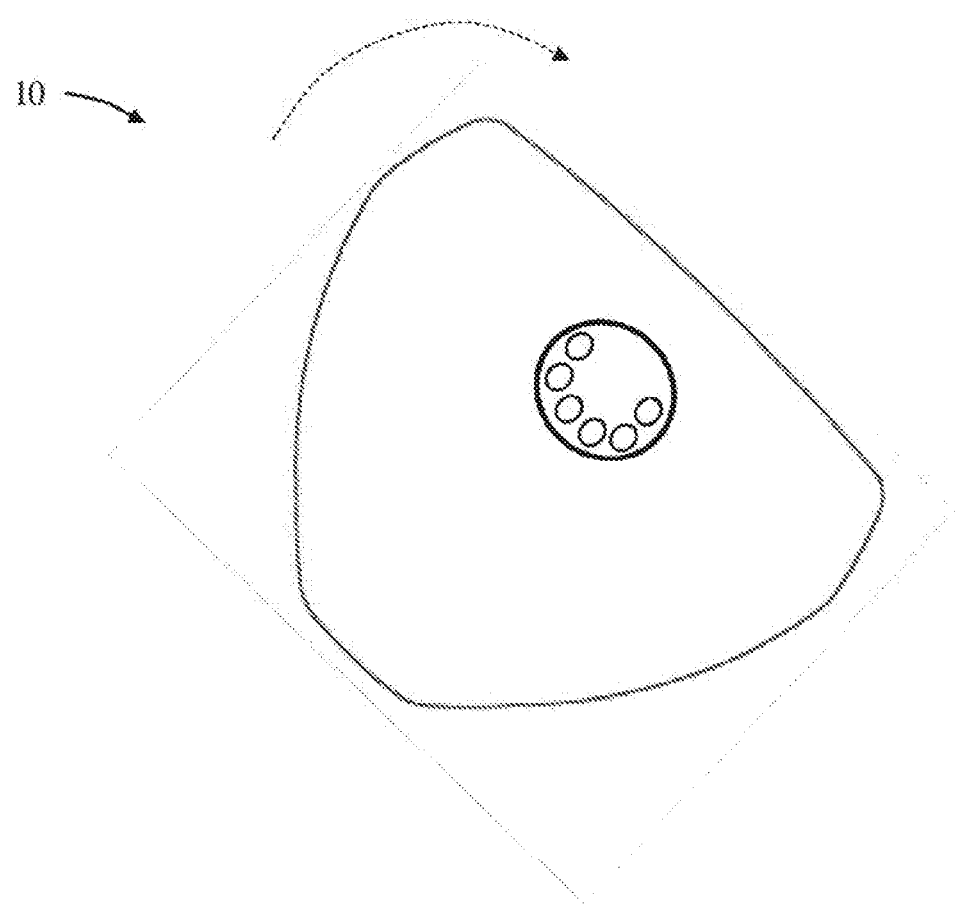
FIG. 4 shows a top view of a robotic cleaning device being displaced according to another embodiment of the present invention.

With reference to FIG. 4, in another exemplifying embodiment, the user causes displacement of the robotic cleaning device by rotating it from a "12 o'clock" orientation to a "2 o'clock" orientation in order to provide the robot 10 with a particular instruction. The IMU 24 may thus sense a change in the orientation, and the controller 16 determines that this particular characteristic of the displacement, i.e. a change in orientation from "12 o'clock" to "2 o'clock", is associated with a given operational mode, such as a change from a normal-energy mode to a a-low energy "eco" mode.

It can further be envisaged that a particular sequence of displacements indicates a particular operational mode to be set. For instance, assuming that the user would want a current cleaning program to finish at an earlier stage than expected, and have the robotic cleaning device 10 return to the charging station, the user may lightly kick the robotic device three times in a sequence to cause three sequential slight displacements, to have the controller 16 finish the program and return to the charging station. Any operational mode could practically be set given that it is predefined in the robotic device 10 and associated with a particular characteristic of the displacement caused by the user.

It should further be noted that the characteristic of the displacement of the robotic cleaning device 10 not necessarily must be determined based on a reference position, but could alternatively be a relative characteristic. For instance, with reference to the previous exemplifying embodiment where the robotic cleaning device is displaced by rotating it from a "12 o'clock" orientation to a "2 o'clock" orientation; the same instruction could be provided to the robot by performing the same relative rotation, such as for instance from a "4 o'clock" orientation to a "6 o'clock" orientation, as the controller will determine the same characteristic of displacement. Further, depending on a rotational velocity to sensed by the IMU 24, the speed with which the robot is rotated could itself imply a particular cleaning program, where for instance a rotation of the robot at a first velocity would imply a first operational mode, while the same rotation of the robot 10 at a second velocity would imply a second operational mode.

Figure 5:
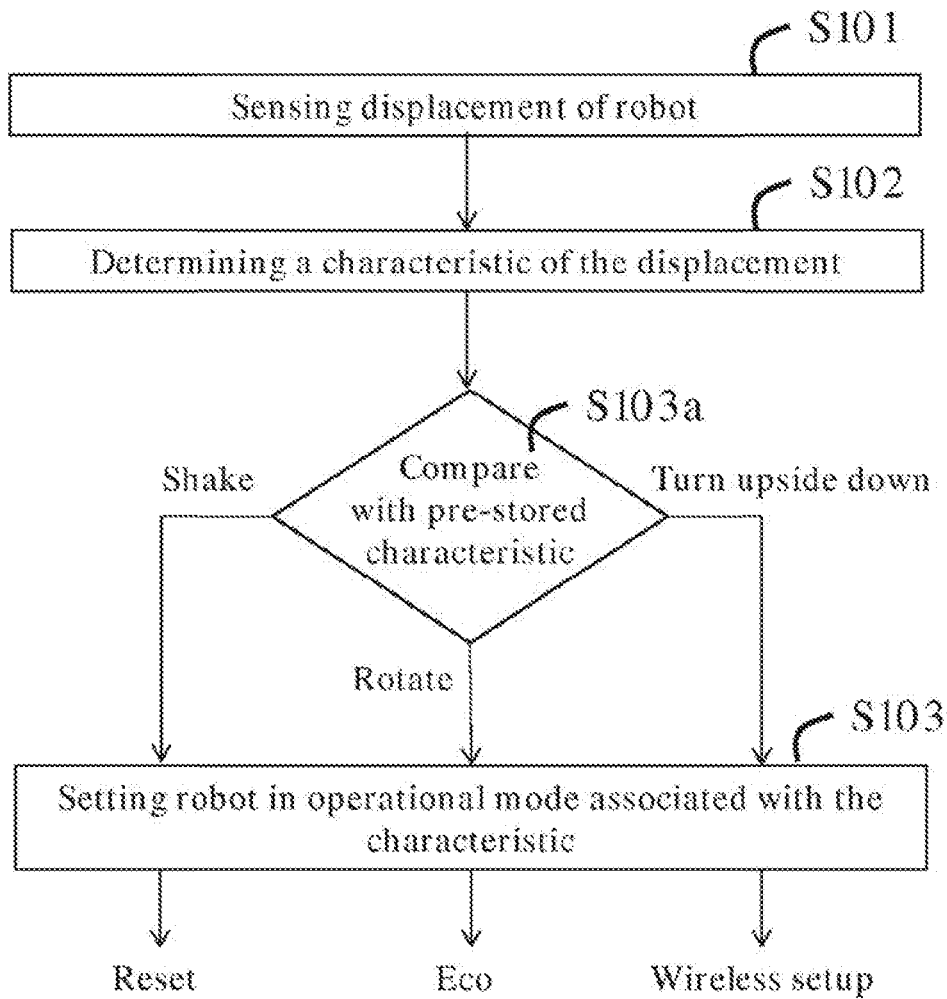
FIG. 5 illustrates a flow chart of another embodiment of a method of controlling a robotic cleaning device according to the present invention.

FIG. 5 shows a flowchart illustrating a further embodiment of the method of the invention of controlling the operation of the robotic cleaning device 10. In this particular exemplifying embodiment, the user picks the robotic device 10 up from the floor and turns it upside down, with its UI 29 facing the floor. As can be seen in the look-up table (typically stored in the memory 25 of the robotic cleaning device 10) of FIG. 5, a displacement caused by flipping the robot upside down would imply that the user wants to set the robot 10 in a wireless setup mode, for instance for having the robot 10 connecting via an air interface to a smart phone of the user, the phone running an appropriate app for communicating with the robot 10.

The IMU 24 of the robotic device 10 will sense this displacement in step S101, and the controller 16 registers the displacement caused by the user and sensed by the IMU 24. The controller 16 will in this embodiment determine the characteristic of displacement in step S102 simply by concluding from IMU data that the robotic device 10 is upside down. This determined characteristic, i.e. in practice a value of a IMU reading, is compared by the controller 16 to entries A, B and C in the look-up table in step S103a, wherein it is determined that there is a match with pre-stored characteristic C. Each pre-stored characteristic is associated with a corresponding operational mode and as can be deducted, a displacement by the user causing the robot 10 to be orientated upside down will have the controller 16 set the robot in "wireless setup" mode in step S103.

Figure 6:
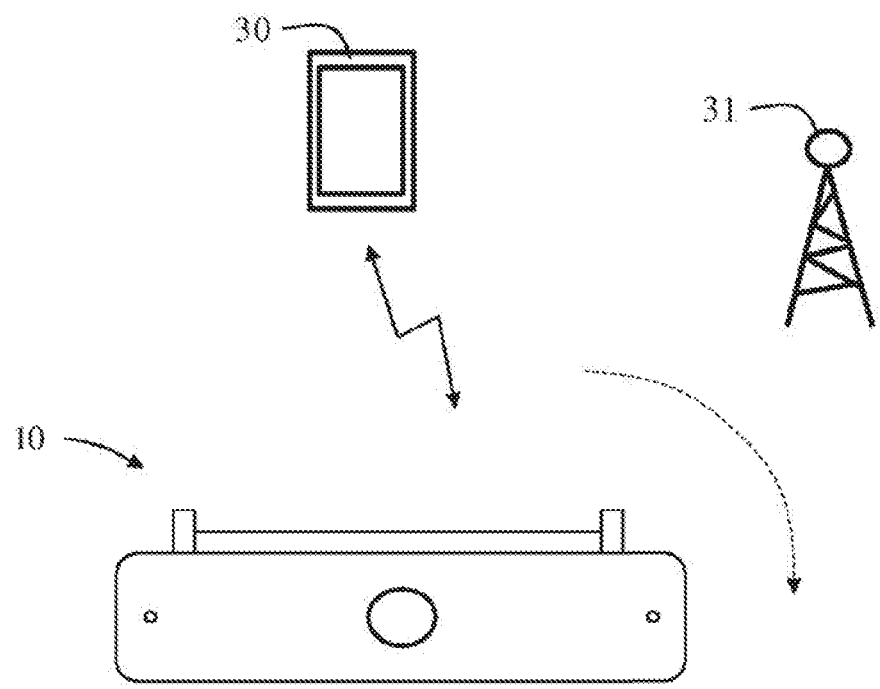
FIG. 6 illustrates a further operational mode being set according to an embodiment of the present invention.

With reference to FIG. 6, in the wireless setup mode, the robot 10 will communicate wirelessly, for example via Bluetooth, with a mobile terminal 30 (such as a smart phone) of the user. The smart phone 30 will then via a to particular app transfer the name of a Wireless Local Area Network (WLAN) of the user and the required password (if any), such that the robot 10 subsequently can connect to the WLAN provided by an Access Point (AP) 31 such as e.g. a home router for wireless WiFi communication. It can be envisaged that the robot 10 should be turned back into its normal position in order to exit the wireless setup mode and enter WiFi mode. In this particular embodiment, the controller 16 is either arranged with transceiver functionality or controls a separate transceiver device (not shown) for performing wireless communication.

Thus, the displacement sensed by the IMU 24 may include both a static change in orientation (such as the robot 10 being upside down) and dynamic changes in orientation (i.e. the user quickly turns the robot 10 in a particular direction and returns it to its original position).

In an embodiment of the present invention, in order to avoid a situation where the user would set the robotic cleaning device in an operational mode with a displacement that very well could occur when the robotic device moves about during normal operation, and thus accidentally have the robot itself enter the operational mode during performance of a normal cleaning program, the operational mode to be set is configured to be associated with a characteristic of displacement which deviates from a characteristic corresponding to a displacement occurring during normal operation of the robotic cleaning device.

Thus, with reference to the properties of displacement illustrated in the look-up table of FIG. 5, it can be concluded that possible the actions to be taken by the user to set the robotic cleaning device in a desired operational mode should be selected such that they do not coincide with "normal" behaviour of the robotic device. With reference to the look-up table, during normal operation the robotic device could not be operated such that it mimics any one of the properties A, B and C.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of controlling operation of a robotic cleaning device, the method comprising:
    sensing a displacement of the robotic cleaning device;
    determining a characteristic of the displacement of the robotic cleaning device;
    compare the determined characteristic of the displacement with a plurality of different predetermined characteristics of the displacement, and based on the comparison, determining a match between the determined characteristic of the displacement and a matching one of the plurality of different predetermined characteristics of the displacement,
    wherein each of the plurality of different predetermined characteristics of the displacement are associated with a different one of a plurality of predetermined operational modes of the robotic cleaning device; and
    setting the robotic cleaning device in an associated one of the plurality of predetermined operational modes that is associated with the matching one of the plurality of different predetermined characteristics of displacement,
    wherein the characteristic of the displacement is a movement pattern where the robotic cleaning device is maneuvered by a user.

2. The method according to claim 1, wherein the operational mode to be set is configured to be associated with a characteristic of displacement which deviates from a characteristic corresponding to a displacement occurring during normal operation of the robotic cleaning device.

3. The method according to any one of claim 1, wherein the determined characteristic of the displacement corresponds to a pattern of movement of the robotic cleaning device caused by a user displacing the robotic cleaning device.

4. The method according to claim 3, wherein the determined characteristic of the displacement comprises a change in orientation of the robotic cleaning device.

5. The method according to claim 3, wherein the determined characteristic of the displacement comprises a change in velocity of the robotic cleaning device.

6. The method according to claim 1, wherein the setting of the robotic cleaning device in the operational mode comprises:
    comparing the determined characteristic of the displacement to a pre-stored characteristic of displacement, the pre-stored characteristic of displacement being associated with a particular operational mode;
    identifying a correspondence between the determined characteristic of the displacement and the pre-stored characteristic of displacement; and
    setting the robotic cleaning device in the particular operational mode associated with the pre-stored characteristic of displacement.

7. The method according to claim 1, wherein the setting of the robotic cleaning device in the operational mode associated with the determined characteristic of the displacement further is based upon a current operational mode of the robotic cleaning device.

8. The method according to claim 1, wherein the setting of the robotic cleaning device in the operational mode associated with the determined characteristic of the displacement comprises:
    enabling wireless setup of the robotic cleaning device to a Wireless Local Area Network, when the robotic cleaning device is displaced to a predetermined orientation.

9. The method of claim 1, wherein the plurality of different predetermined characteristics of the displacement includes at least two of the robot being turned upside down by the user, the robot being shaken by the user, and the robot being rotated by the user.

10. The method of claim 9, wherein the plurality of predetermined operational modes of the robotic cleaning device includes at least two of the robot enabling a wireless setup, the robot being reset, and the robot entering an economical mode.

11. A robotic cleaning device comprising:
    an inertia measurement unit configured to sense a displacement of the robotic cleaning device; and
    a controller configured to:
        determine a characteristic of the displacement of the robotic cleaning device,
        compare the determined characteristic of the displacement with a plurality of different predetermined characteristics of the displacement, and based on the comparison, determining a match between the determined characteristic of the displacement and a matching one of the plurality of different predetermined characteristics of the displacement, wherein each of the plurality of different predetermined characteristics of the displacement are associated with a different one of a plurality of predetermined operational modes of the robotic cleaning device, and set the robotic cleaning device in an associated one of the plurality of predetermined operational modes that is associated with the matching one of the plurality of different predetermined characteristics of displacement, wherein the characteristic of the displacement is a movement pattern where the robotic cleaning device is maneuvered by a user.

12. The robotic cleaning device according to claim 11, wherein the operational mode to be set is configured to be associated with a characteristic of displacement which deviates from a characteristic corresponding to a displacement occurring during normal operation of the robotic cleaning device.

13. The robotic cleaning device according to claim 11, wherein the determined characteristic of the displacement corresponds to a pattern of movement of the robotic cleaning device caused by a user displacing the robotic cleaning device.

14. The robotic cleaning device according to claim 11, wherein the determined characteristic of the displacement comprises a change in orientation of the robotic cleaning device.

15. The robotic cleaning device according to claim 11, wherein the determined characteristic of the displacement comprises a change in velocity of the robotic cleaning device.

16. The robotic cleaning device according to claim 11, wherein the controller further is arranged, when setting the robotic cleaning device in the operational mode, to:
compare the determined characteristic of the displacement to a pre-stored characteristic of displacement, the pre-stored characteristic of displacement being associated with a particular operational mode; and
identify a correspondence between the determined characteristic of the displacement and the pre-stored characteristic of displacement; and
set the robotic cleaning device in the particular operational mode associated with the pre-stored characteristic of displacement.

17. The robotic cleaning device according to claim 11, wherein the controller is arranged to set the robotic cleaning device in the operational mode associated with the determined characteristic of the displacement by taking into account a current operational mode of the robotic cleaning device.

18. The robotic cleaning device according to claim 11, wherein the controller is arranged, when setting the robotic cleaning device in the operational mode associated with the determined characteristic of the displacement, to:
enable wireless setup of the robotic cleaning device to a Wireless Local Area Network when the robotic cleaning device is displaced to a predetermined orientation.

19. The robotic cleaning device according to claim 11, wherein the plurality of different predetermined characteristics of the displacement includes at least two of the robot being turned upside down by the user, the robot being shaken by the user, and the robot being rotated by the user.

20. The robotic cleaning device according to claim 11, wherein the plurality of predetermined operational modes of the robotic cleaning device includes at least two of the robot enabling a wireless setup, the robot being reset, and the robot entering an economical mode.

* * * * *